(12) United States Patent
Raman et al.

(10) Patent No.: US 12,399,037 B2
(45) Date of Patent: Aug. 26, 2025

(54) POSITION SENSING DEVICE

(71) Applicant: Melexis Technologies SA, Bevaix (CH)

(72) Inventors: Johan Raman, Knesselare (BE); Gael Close, Morges (CH); Pieter Rombouts, Mariakerke (BE)

(73) Assignee: Melexis Technologies SA, Bevaix (CH)

( * ) Notice: Subject to any disclaimer, the term of this patent is extended or adjusted under 35 U.S.C. 154(b) by 435 days.

(21) Appl. No.: 17/864,967

(22) Filed: Jul. 14, 2022

(65) Prior Publication Data

US 2022/0373362 A1 Nov. 24, 2022

Related U.S. Application Data

(63) Continuation of application No. 16/256,146, filed on Jan. 24, 2019, now Pat. No. 11,428,549.

(30) Foreign Application Priority Data

Jan. 25, 2018 (EP) .................................... 18153346

(51) Int. Cl.
*G01D 5/244* (2006.01)
*G01D 5/243* (2006.01)
(Continued)

(52) U.S. Cl.
CPC ......... *G01D 5/24476* (2013.01); *G01D 5/243* (2013.01); *G01D 5/2448* (2013.01);
(Continued)

(58) Field of Classification Search
CPC .... G01D 18/004; G01D 18/008; G01D 5/142; G01D 5/243; G01D 5/24476; G01D 5/2448
See application file for complete search history.

(56) References Cited

U.S. PATENT DOCUMENTS

| 5,412,317 A | * | 5/1995 | Kyoizumi | ............... | G01B 7/003 |
| | | | | | 324/207.13 |
| 6,693,420 B1 | * | 2/2004 | Gill | ........................ | G01D 5/202 |
| | | | | | 324/207.16 |

(Continued)

FOREIGN PATENT DOCUMENTS

| CN | 205317219 U | 6/2016 |
| EP | 2038615 | 3/2009 |

OTHER PUBLICATIONS

Extended European Search Report from EP Application No. 18153346.4, Jun. 21, 2018.

*Primary Examiner* — Kyle R Quigley
(74) *Attorney, Agent, or Firm* — Workman Nydegger

(57) ABSTRACT

A position sensing device for measuring a position, comprises a position sensing device for measuring a position; a plurality of sensors arranged to produce sense signals each being a function of an input phase representative of a position to be measured; a combiner circuit arranged to generate an error signal by combining the sense signals according to an array of weight factors; a processing block including a loop filter to filter the error signal and arranged to output a phase value representative of the position; and a feedback loop comprising a feedback signal unit arranged for receiving the output phase value and for adjusting based on the received output phase value of the array of weight factors.

14 Claims, 12 Drawing Sheets

(51) Int. Cl.
*G01D 18/00* (2006.01)
*G01D 5/14* (2006.01)

(52) U.S. Cl.
CPC ......... *G01D 18/004* (2013.01); *G01D 18/008* (2013.01); *G01D 5/142* (2013.01)

(56) References Cited

U.S. PATENT DOCUMENTS

| | | | |
|---|---|---|---|
| 7,358,880 | B1 | 4/2008 | Melanson |
| 9,734,703 | B1 | 8/2017 | Chhabra |
| 2005/0068044 | A1 | 3/2005 | Peine et al. |
| 2006/0255794 | A1* | 11/2006 | Lee ..................... G01D 5/2053 324/207.17 |
| 2006/0268448 | A1 | 11/2006 | Shigematsu |
| 2007/0247141 | A1 | 10/2007 | Pastre et al. |
| 2007/0279044 | A1 | 12/2007 | Rossmann et al. |
| 2007/0296411 | A1 | 12/2007 | Thomas et al. |
| 2010/0026287 | A1* | 2/2010 | Muthers ............. G01R 33/0283 324/246 |
| 2010/0231201 | A1* | 9/2010 | Hollman ................ G01P 3/488 324/173 |
| 2013/0093412 | A1 | 4/2013 | Anelli et al. |
| 2014/0225597 | A1 | 8/2014 | Romero et al. |
| 2015/0009517 | A1 | 1/2015 | Shimizu |
| 2015/0226581 | A1 | 8/2015 | Schott et al. |
| 2015/0362563 | A1 | 12/2015 | Romani et al. |
| 2016/0363638 | A1 | 12/2016 | Daubert |
| 2017/0063204 | A1* | 3/2017 | Dumas ................ G01D 5/2013 |

\* cited by examiner

POSITION SENSING DEVICE

FIELD OF THE INVENTION

The present invention is generally related to the field of position sensors, whereby position is defined by a linear displacement, a rotation angle etc.

BACKGROUND OF THE INVENTION

Position sensors, for example angular position sensors for measuring an angular position of a sensor (e.g., mounted to a stator) relative to a source of a magnetic field (e.g., a magnet mounted to a rotor), are known in the art. By measuring the strength of the magnetic field at various locations and/or in various directions, the position or orientation of the magnet(s) relative to the sensor elements can be determined. Position sensors, in which the magnetic field is generated by an excitation coil are also known in the field, e.g., resolvers which have an excitation coil integrated in a rotor and sensing coils in a stator. Furthermore, position sensors are known which rely on detecting the magnetic field associated with eddy currents, e.g., eddy currents being generated in a moving target consisting of conductive material.

Position sensors providing a digital output representative of the sensed position are known in the art and are in many applications preferred over corresponding sensors, which only provide an analog output.

US2016/363638 discloses a magnetic field sensor for angle detection with a phase-locked loop that receives a measured magnetic field signal formed from sensing element output signals of a plurality of magnetic field sensing elements in response to a magnetic field. The phase-locked loop is configured to generate an angle signal having a value indicative of the angle of the magnetic field. The sensing elements are scanned sequentially, thus obtaining a sequence of readout values of individual sensing elements that, as a function of time, form a single measured magnetic field signal. During each readout time slot, only a single sensing element is being read out. Consequently, the signal-to-noise ratio during one readout time slot is determined by a single sensing element. Furthermore, the measured magnetic field signal then has the property that the process can be reversed, i.e., with knowledge of the applied scanning scheme it is possible to deduce the readout value of each individual sensing element.

Hence, there is a need for a position sensing device that works faster and yields a better signal-to-noise ratio.

SUMMARY OF THE INVENTION

It is an object of embodiments of the present invention to provide for a position sensing device capable of providing a digital output representative of the sensed position.

The above objective is accomplished by the solution according to the present invention.

In a first aspect the invention relates to a position sensing device for measuring a position, comprising
- a plurality of sensors arranged to produce sense signals each being a function of an input phase representative of a position to be measured,
- combiner circuit arranged to generate an error signal by combining the sense signals according to an array of weight factors,
- a processing block comprising a loop filter to filter said error signal, wherein the processing block is further arranged for deriving from the filtered error signal a phase value representative of the position and for outputting the phase value representative of the position,
- a feedback loop comprising a feedback signal unit arranged for receiving the output phase value and for adjusting based on the received output phase value the array of weight factors, so that the weight factors are a function of the output phase value.

The proposed solution allows for reading out an estimated signal indicative of the position to be measured with reduced latency and a good noise performance. The position is typically a linear position and/or a rotation angle. The processing block processes a combination of multiple sense signals at the same time, i.e., in a parallel way. In other words, at any time instant, the signal being processed is a combination of the various sense signals, wherein the information of each signal contribution is merged in a way that, as a rule, cannot be reversed. The processing in parallel allows for a low position/angle error when the input position/angle changes with high (angular) speed. In the invention an error estimate is obtained during each readout time-slot. So, for the same readout speed, this approach is faster in producing an error estimate than the prior art solutions where the various sensing elements are scanned and processed sequentially. The parallel readout also positively affects the noise performance. The sensors provide their signal at every time instant. The sensor signals are combined in a weighted way in the combiner circuit, where the different noise contributions of sensors are averaged out, leading to an output with better signal-to-noise (SNR) compared to the SNR of an individual sensing element signals. In other words, the parallel readout of the sensors allows averaging the noise at each time instant.

In embodiments the processing block comprises a quantizer arranged to receive the filtered error signal and to generate the phase value representative of the position.

In embodiments the error signal is an analog signal. In such case the loop filter of the processing block preferably comprises an analog filter arranged to receive said error signal and to output a low-pass filtered version of the error signal. In preferred embodiments the analog filter comprises an analog integrator for outputting a version of the error signal accumulated over time.

In advantageous embodiments the processing block comprises an analog-to-digital converter for digitizing the continuous time error signal and/or the low-pass filtered error signal.

Preferably the loop filter of the processing block comprises a digital filter. In preferred embodiments the digital filter comprises a digital integrator.

In preferred embodiments the feedback signal unit comprises an angle-to-gain conversion block arranged for receiving the output phase value.

In embodiments of the invention the position sensing device comprises one or more digital gain control units arranged to adapt said weight factors. In certain embodiments the position sensing device comprises one or more analog multiplexers to implement the array of weight factors. In certain embodiments the position sensing device comprises components which can be switchably connected to implement the array of weight factors.

The sensors are in preferred embodiments magnetic sensors. They can be Hall elements, giant magnetoresistance or tunneling magnetoresistance sensing elements. They can also be detection coils that sense a time-varying magnetic field. The sensors are preferably arranged for measuring an angle of a magnetic field.

In an embodiment the plurality of sensors comprises at least three sensors arranged to produce sense signals each being a different function of an input phase representative of a position to be measured.

In an aspect the invention relates to an arrangement comprising a position sensing device as previously described and a multi-pole magnet.

In another aspect the invention relates to a position sensing device for measuring a position, comprising
- a plurality of sensors arranged to produce sense signals each being a function of an input phase representative of a position to be measured,
- a combiner circuit arranged to generate an error signal by combining said sense signals according to an array of weight factors,
- a processing block comprising a loop filter to filter said error signal, said loop filter comprising a cascade of an analog filter, an analog-to-digital converter and a digital filter, and further comprising a quantizer arranged to receive said filtered error signal and to produce from said filtered error signal a quantizer output signal,
- a feedback loop comprising a feedback signal unit arranged for receiving said quantizer output signal and for adjusting based on said received quantizer output signal said array of weight factors, so that said weight factors are a function of said quantizer output signal,
- a noise canceling block arranged for combining said quantizer output signal with a digital signal upstream of said quantizer such that the combined signal provides an improved phase value representative of said position and having a reduced dependence on quantization noise caused by said quantizer.

In a preferred embodiment the noise canceling block comprises a first recombination filter arranged to receive said quantizer output signal, a second recombination filter arranged to receive a digital signal output by said analog-to-digital converter and an adder circuit for adding outputs of said first and said second recombination filter, wherein said first and said second recombination filter are selected to obtain an improved phase value representative of said position being less dependent on quantization noise caused by said quantizer than the signal at the quantizer output.

In a preferred embodiment the analog filter of the loop filter has a transfer function substantially equal to the ratio of the first recombination filter's transfer function and the second recombination filter's transfer function. In case the analog filter transfer function exactly equals said ratio, the quantization noise contribution is completely eliminated. However, even if there is a relative deviation Δ between the analog filter transfer function and the ratio, there is still an important reduction of the quantization noise caused by the quantizer, provided the relative deviation Δ remains moderate, e.g., |Δ|<10%.

Preferably the first recombination filter and/or said second recombination filter are adaptive. Preferably the first recombination filter and/or second recombination filter are adapted to remove a dependency of the analog-to-digital converted output signal from the quantization noise of the quantizer determined in the digital domain. In a specific embodiment the quantization noise is determined by digitally subtracting the input of the quantizer from its output. The first recombination filter and/or the second recombination filter may have a programmable gain. The analog-to-digital converter advantageously comprises a gain controller unit to determine that programmable gain.

In embodiments of the invention the quantizer has a lower resolution than the analog-to-digital converter. This is particularly advantageous for reducing the complexity associated with the combiner block.

In certain embodiments the position sensing device comprises a delay compensation filter to compensate for a delay introduced, for example, by said first recombination filter.

In preferred embodiments the analog-to-digital converter is a Sigma-Delta modulator comprising a second quantizer embedded in an internal feedback loop containing a further analog filter and a feedback digital-to-analog converter.

Advantageously the first recombination filter and/or second recombination filter are Finite Impulse Response filters. In a specific embodiment the first recombination filter is a FIR filter proportional to the numerator polynomial in $z^{-1}$ of $H_a(z)$, and/or B(z) is a FIR filter proportional to the denominator polynomial in $z^{-1}$ of $H_a(z)$.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
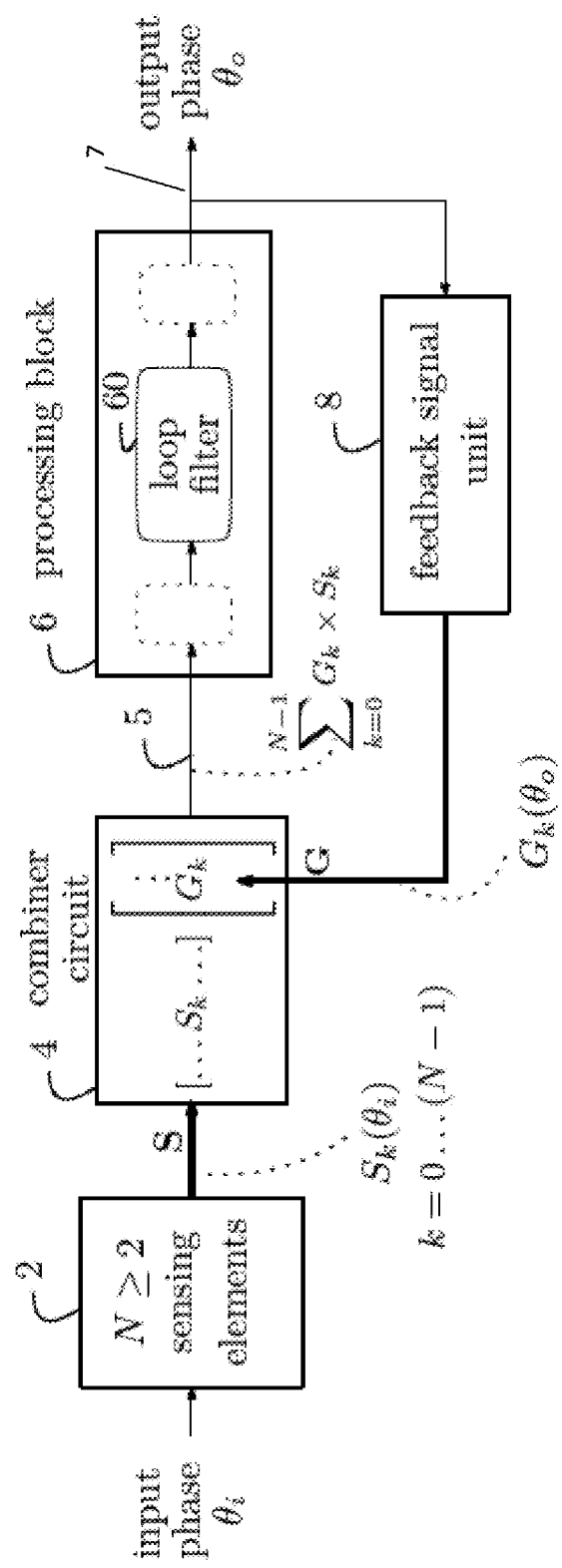
FIG. 1 illustrates a generic scheme of a position sensing device according to the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention relates to a position sensor. Position may refer to a linear displacement, a rotation angle, etc. The proposed position sensing device can for example be used for high rotation speeds up to 80000 rpm and is capable of tracking the rotation angle at any constant rotation speed with only a small error, e.g., less than ±2°. The position sensing device comprises a plurality of sensors that produce a plurality of analog sensing signals on which the device operates in a tracking mode in order to track the position. A tracking loop keeps track of an external displacement/angle in an incremental way, based on comparing a 'predicted' output to the actual phase/position/angle.

In preferred embodiments the position sensing device is an angular sensor using an external magnet. In other embodiments the position sensor is an angular sensor (an electrical resolver) based on mutual inductance. In yet other embodiments the position sensor is a linear position sensor, e.g., based on a magnet or on an electrically excited coil being linearly displaced relative to the sensor.

In any of the envisaged sensor types a generalized position is to be measured, e.g., a linear position or an angle. Two or more sense signals are available, e.g., $\cos \theta_i$ and $\sin \theta_i$, in which the phase/angle $\theta_i$ changes as a function of the (generalized) position.

An input phase $\theta_i$ is associated with the position to be measured. The sensor system comprises $N \geq 2$ sensing elements (i.e., at least two) providing analog sensing signals representative of the input phase/angle $\theta_i$. These sensing signals can, for instance, be represented as $$S_k(\theta_i) = A\cos\left(\theta_i - k\frac{2\pi}{N}\right) \quad k = 0, 1, \ldots N-1 \qquad (1)$$

with A denoting the amplitude of the sensing element signals. As can be seen from equation 1, each sensing signal has a different phase, which in this case is a function of the input phase/angle $\theta_i$ and the position of the HE element with respect to a reference.

A subclass of the proposed position sensors are angular sensors, in which case the input phase $\theta_i$ may be the same as the mechanical rotation angle $\theta_{mech}$. The input phase $\theta_i$ may also be a linear function of the mechanical rotation angle. Alternatively, it may be a non-linear function of the mechanical rotation angle, in which case additional corrections of the nonlinearity may be included A subclass of the proposed position sensors are linear position sensors, in which case the input phase $\theta_i$ may be a linear function of the mechanical displacement $x_{mech}$, e.g., $\theta_i = k \cdot x_{mech}$ with k some proportionality factor. An extra constant $\varphi_0$ may be present as well. Also here, the input phase may be a non-linear function of the mechanical displacement, in which case additional corrections of the non-linearity may be included.

A subclass of the proposed position sensors are magnetic position sensors which, for instance, measure the displacement of a magnetic field (e.g., generated by a magnet or an excitation coil) with respect to the position sensor.

A subclass of the proposed angular sensors are magnetic angle sensors which measure the angle of a magnetic field e.g., generated by a magnet. In this subclass the sensing elements may be based on horizontal or vertical Hall elements, giant magnetoresistance (GMR) or tunnelling magnetoresistance (TMR) sensing elements, etc. This may be in combination with a magnetic layer (e.g., an integrated magnetic concentrator (IMC)) that locally alters the magnetic field, e.g., change its direction, e.g., from an in-plane magnetic field to a vertical magnetic field. In the magnetic case the sensing element signals as in equation (1) can also be interpreted as projections of the magnetic field in different directions, e.g., along the directions identified by the angles $k \cdot 2\pi/N$ for $k=0, 1, \ldots, N-1$. When also a magnetic layer is involved, the shape of the magnetic layer may be chosen to obtain projections.

In a subclass of the proposed angular sensors a plurality of sensing element signals is obtained as the output of an electrical resolver having at least $N \geq 2$ sensing coils. These electrical resolvers typically rely on an angle dependent mutual inductance between a driving coil and the different sense coils.

In a subclass of the proposed angular sensors a plurality of sensing element signals is obtained as the output of at least $N \geq 2$ sensing coils which pick up the magnetic field from eddy currents induced in a conductive target. These eddy currents can for instance be induced in the target by means of a coil driven by an alternating electrical excitation. The shape of the conductive target is such that a rotation or displacement of the target relative to the sensing coils leads to an angle-dependent or displacement-dependent change of the sensing coil signals.

A general block scheme of an embodiment of the position sensing device of this invention is shown in FIG. 1. The generalized position to be measured, represented by an input phase $\theta_i$, affects the output of at least two sensors (2). The resulting sense signals are fed to the combiner circuit (4), where the signals $S_k$ are each multiplied with their corresponding weight factor $G_k$. The resulting weighted sum signal (5) next goes to the processing block (6), where it is filtered in a loop filter (60) and an estimate of the output phase $\theta_o$ (7) is obtained. The signal produced by the combiner circuit is a signal representative of the error between the input phase $\theta_i$ and the estimated output phase $\theta_o$. The output phase $\theta_o$ (7) is fed to a feedback signal unit (8) where a phase-to-weight conversion is performed, and updated weight factors are determined for use in the next iteration.

The processing block (6) processes a combination of the various sense signals at the same time, i.e., in a parallel fashion. This processing in parallel allows for a low position/angle error when the input position/angle changes with high (angular) speed. An error estimate is obtained during each readout time-slot, thus, for the same readout speed, faster than when adopting a sequential approach. As the sensor signals are combined in the combiner circuit, the different noise contributions of sensors are averaged out, leading to an output with better signal-to-noise (SNR) compared to the SNR of an individual sensing element signal. In other words, the parallel readout of the sensors allows averaging the noise at each time instant. The readout of a sensing element may also comprise averaging and/or combining the outcomes of measurements over different phases, such as is for instance the case when applying spinning current averaging in Hall readout. Such combining/averaging may take place within each time-slot. Each sense signal may then correspond to an averaged/combined value of readouts on a same sensing element. Also in this case, the same conclusion holds that a parallel processing of the thus obtained sense signals allows for better SNR and/or faster error estimates compared to a sequential processing.

FIG. 1 details the overall structure of the position sensing device according to the present invention and clarifies signals involved at the system level. The signals in this scheme may be analog signals, digital signals or even any other type of signals that carry a similar kind of information as the signals appearing in the general block diagram. For example, signals received from sensing elements may be in the digital domain, e.g., when these sensing elements are by themselves more sophisticated systems that comprise a means for conversion to the digital domain. In the latter case the combiner circuit, processing block and phase-to-weights conversion block may be completely in the digital domain.

Figure 2A:
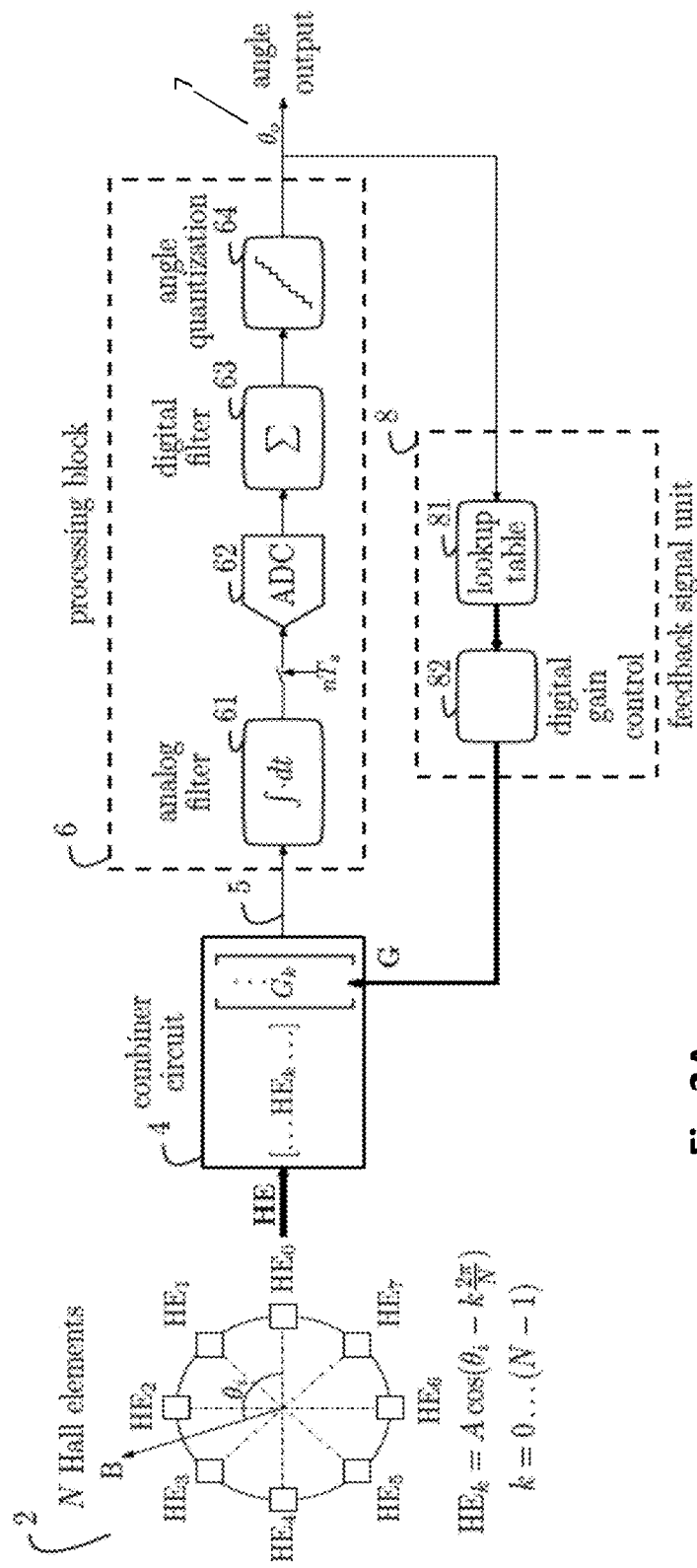
FIG. 2A illustrates an embodiment of a position sensing device of this invention where the sensed magnetic fields are due to a rotating magnet.

A practical embodiment is illustrated in FIG. 2A. In this example an angle sensor is considered based on a measurement of the direction of a magnetic field, e.g., generated by a permanent magnet. Furthermore, Hall elements are used as primary sensing elements in this embodiment. The main signal path in FIG. 2A must comprise at least two Hall plates. In this particular case there are eight Hall plates. In FIG. 2A they are evenly spread over a full circle. In other embodiments they may be evenly spread over only a part of a circle or not evenly spread. The actual spreading affects how the weights are adapted as a function of the output angle. Some configurations may be in that sense preferable over other configurations, because they lead to simpler relations.

The combiner circuit (4) in FIG. 2A generates a weighted combination of Hall element (HE) signals. Hence, each HE signal is multiplied with a weight factor corresponding to that HE signal. Hence, the number of weight factors equals the number of sensor signals, in this particular example HE signals. The resulting signal (5) is next filtered in a processing block (6). Details on the filtering are provided below. There should be at least two linearly independent sensor signals, i.e., at least two sensor signals can be identified which are not simply proportional to each other. In other words, there are at least two different functions involved, where a 'different function' can also be a same function, e.g., a cosine function, but with a different argument, e.g., an argument which is a different combination of the input phase and a fixed phase. This can also be seen as sensing in at least two different directions, e.g., in the case of a magnetic field the sensors sense projections of the magnetic field in different directions, for example in the plane of the sensor, with an angle of 45° and with an angle of 90°. The processing block (6) then outputs a phase value $\theta_o$ (7) representative of the position to be determined. The feedback signal unit (8) in the feedback loop is fed with the phase value output by the processing block and determines updated values of the various weight factors in the array. These updated weight values are then used when the next array of sense signals comes in. The resulting weighted signal is so indicative of the present error between the input phase $\theta_i$ and the output angle $\theta_o$.

The combiner circuit (4) in FIG. 2A generates a weighted combination of Hall element (HE) signals in the analog domain. It is advantageous to have an analog filter (61) providing analog low-pass filtering in the device, as this yields low noise and implicit anti-aliasing filtering. The analog filter (61) may be for instance a continuous-time analog integrator. The ADC (62) converts the integrator output, which for the shown system is representative of the angular speed, to the digital domain. The digital filter (63), in this embodiment a digital integrator/accumulator with an added feedforward path to improve the stability of the tracking loop, converts the digital ADC signal into an angle. Alternatively, the tracking loop stability can also be improved by proper choice of the analog filter, e.g., by adding a zero to the transfer function, e.g., in case of an integrator implemented by adding a resistor in series with the capacitor used in the integrator. In this particular example, the combination of the analog filter (61), the ADC (62) and the digital filter (63) constitute the loop filter (60) receiving at its input a continuous-time signal from the combiner circuit. Next this angle is quantized, whereby an angle at its input is rounded/truncated/mapped to an output angle belonging to a finite set of possible angles. The finite set may contain integer multiples of a basic angle, e.g., multiples of 22.5° (corresponding to 4 bits), but this is not required. The mapping may be stochastic in nature, e.g., involving the use of dither (i.e., an intentionally applied form of noise), e.g., to randomize quantization errors. In the feedback loop a digital mapping is performed, e.g., implemented as a lookup table or digital logic, for translating the quantized angle to an array of N gain coefficients $G_k$, which determine the weights used in the combiner circuit.

Figure 2B:
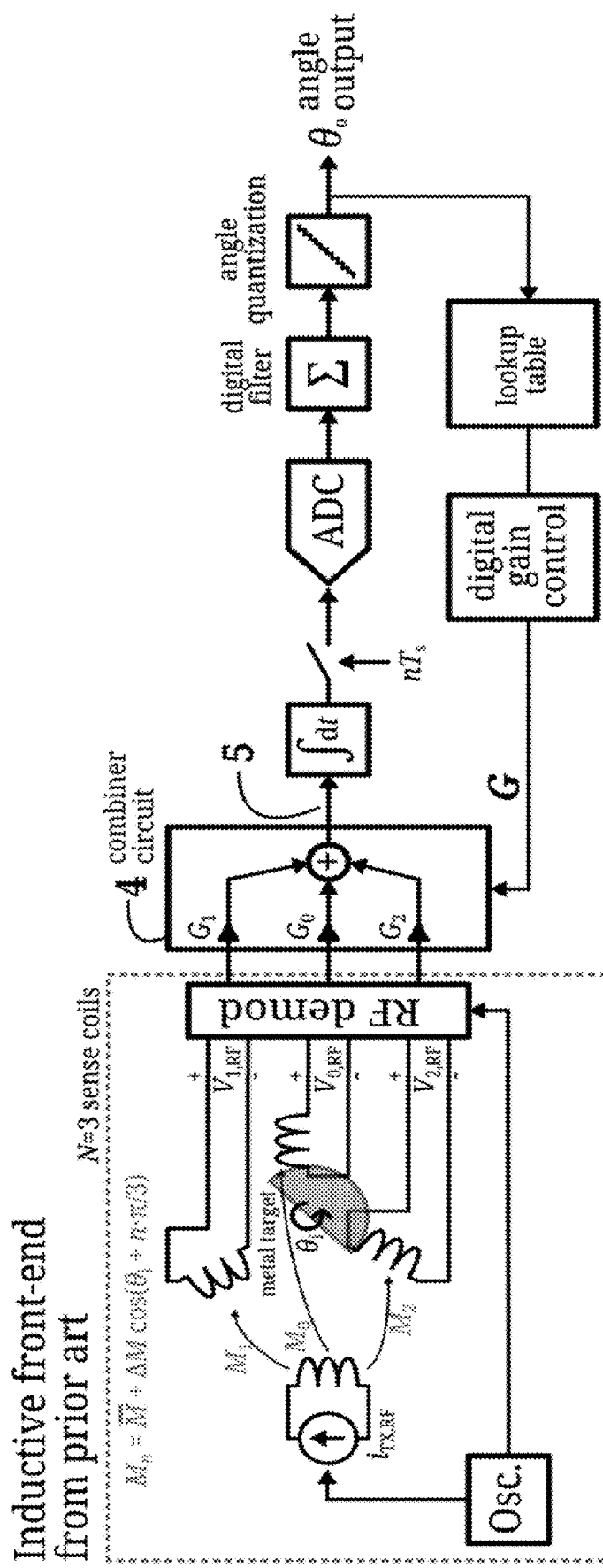
FIG. 2B illustrates an embodiment of the position sensing device where the sensed magnetic fields are due to eddy currents being induced by an excitation coil in a movable metal target.

In another exemplary embodiment, illustrated in FIG. 2B, the working principle of the angle sensor is based on sensing the magnetic field of eddy currents in a movable metal target. In this embodiment a changing magnetic field is generated by means of an excitation coil being fed with an alternating current. The alternating current may be derived from an oscillator circuit. An efficient solution is to use the excitation coils self-inductance L in combination with a tank capacitance C as part of an LC oscillator. By operating the excitation coil at resonance, the current through is effectively boosted by the quality factor of the resonant tank. The time-varying current in the excitation coil then generates a time-varying magnetic field that induces eddy currents in a rotatable metal target. These eddy currents rise and fall at the same rate as the excitation field. The magnetic field generated by the eddy currents is therefore also time-varying at the same frequency. The changing magnetic field associated with the time-varying eddy currents induces voltages in a number of sensing coils. In the present example three sensing coils oriented 120° apart are used. The metal target shape is such that when rotating the target, the coupling between the target and the individual sensing coils changes (i.e., is a function of the rotation angle). The amplitude of the different sense-coil signals thus become a function of the rotation angle. Because the time-varying magnetic fields generated by the eddy current are also at the oscillator frequency, the sense-coil signals can be demodulated using the oscillator signal(s) to extract the amplitude information. This then provides a multitude of sense signals with a phase representative for the rotation angle of the target. Similar to the embodiment of FIG. 2A, the combiner circuit (4) in FIG. 2B generates a weighted combination of the demodulated sense signals in the analog domain. The rest of the building blocks in FIG. 2B are similar in purpose and functionality to those in FIG. 2A. A variant of the present embodiment (not shown), is when the combiner circuit (4) operates directly on the sense coil signals (without demodulation) and the output of the combiner circuit (4) is then demodulated.

The various building blocks of the position sensing device of the invention are now discussed more in detail. For ease of description, below the focus is on an angular position sensor. However, it is to be understood that any reference to an "angle" in this description may need to be translated into alternative terms in case of other position sensors. For instance, "angle" may need to be replaced by "phase" or "phase representative of a position".

Combiner Circuit

The combiner circuit is a key component of the proposed device. Its task is to provide a measure of the difference between the input angle $\theta_i$ and the output angle $\theta_o$, i.e., an estimate of the input angle. However, since the input angle $\theta_i$ is not directly available, but rather encoded as a set of trigonometric values that represent the projections of the magnetic field angle $\theta_i$ on a multitude of axes, this needs to be obtained in an indirect way. Referring to FIG. 2A, the combiner circuit (4) actually makes a linear combination of HE signals multiplied by the weights, i.e., $\Sigma_{k=0}^{N-1} G_k \times HE_k$. The weights $G_k$ used in this expression are—by construction—function of the output angle $\theta_o$, i.e., $G_k = G_k(\theta_o)$. The combiner applies the array of weights to the set of individual sensor signals and combines (adds) these weighted contributions to produce an output representative of the angle/phase difference.

In general, the functions $G_k(\theta_o)$ defining the various weight coefficients of the array as a function of the output angle may be determined as follows. A single value $\theta$ is considered from the set of possible output angles. The N sensor elements signals $S_k(\theta)$ are determined when the input angle $\theta_i$ is equal to the considered output angle value $\theta$. A set of non-zero values $G_k(\theta)$ (k=0, ..., N−1) can then be found to solve the linear equation $\Sigma_{k=0}^{N-1} G_k(\theta) \times S_k(\theta) = 0$. This homogeneous linear equation has an infinite number of solutions, which means this freedom can be exploited, e.g., for optimizing the combiner circuit performance. A possible optimization is explained next. For this, the N sensor elements signals $S_k$ are considered when $\theta_i$ is close to $\theta$, but may deviate from it by an amount x, i.e., the input angle $\theta_i$ is equal to $\theta+x$. For x sufficiently small, the sensing element signals can be expanded as $$S_k = S_k(\theta) + S'_k(\theta) \cdot x + n_k \quad k=0 \ldots (N-1) \tag{2}$$

with $S'_k$ denoting the derivative of the $k^{th}$ sensor signal with respect to angle/phase changes, and $n_k$ denoting the noise of the $k^{th}$ sensing element. A set of gain coefficients $G_k$ can be found for this particular output angle $\theta$ for which the output of the combiner circuit has good (optimal) signal-to-noise ratio (SNR). The output of the combiner circuit can be written as:

$$\sum_{k=0}^{N-1} G_k S_k = \sum_{k=0}^{N-1} G_k S_k(\theta) + \left(\sum_{k=0}^{N-1} G_k S'_k(\theta)\right) \cdot x + \sum_{k=0}^{N-1} G_k n_k \tag{3}$$

Assuming the noise components $n_k$ are uncorrelated and have equal variance, a set of optimum gains $G_k$ that maximize the output SNR can be derived analytically. One set of optimal weights can be shown to be:

$$G_k(\theta) = \frac{d}{d\theta}\left(\frac{S_k(\theta)}{\sqrt{\frac{2}{N}\sum_{k=0}^{N-1} S_k^2(\theta)}}\right), \quad k = 0 \ldots (N-1) \tag{4}$$

Other optimal weights can be obtained by applying a common scale factor to the above.

By repeating the above procedure for all possible output angles, one can obtain weight coefficients $G_k(\theta)$ for all angles $\theta$ from the set of possible output angles. This means that for any possible output angle $\theta_o$, the weight coefficients $G_k(\theta_o)$, (k=0, ..., N−1) are well defined.

In the case of sensing element signals given by expression (1), the optimal weights of equation (4) are given by $$G_k = -\sin\left(\theta_o - k\frac{2\pi}{N}\right) \quad (5)$$

The optimal weights are in this case simple trigonometric functions depending on the output angle. With these weights, the combiner circuit output can be shown to be (for the considered case):

$$\sum_{k=0}^{N-1} G_k S_k = \frac{N}{2} A \cdot \sin(\theta_i - \theta_o) \quad (6)$$

hence the output signal of the combiner circuit is proportional to $\sin(\theta_i-\theta_o)$. Because the goal of the overall feedback loop is to let the output angle $\theta_o$ track the input angle $\theta_i$, the difference $\theta_i-\theta_o$ is relative small (in tracking mode), and in good approximation one has $\sin(\theta_i-\theta_o)=\theta_i-\theta_o$.

The combiner circuit provides an output which is related to the angle/phase difference, e.g., a signal proportional to $\sin(\theta_i-\theta_o)$. In certain respect this is similar to the output signal of a phase detector in a PLL. However, while the output may be similar, the combiner circuit is quite different from a classical phase detector circuit. Classical phase detector circuits operate on input signals having a non-zero frequency, i.e., they evolve in time even when the phases themselves remain constant. One classical phase detector is a multiplier that multiplies two sinusoidal or square-wave like input signals, in most cases followed by a filter that removes double- and higher frequency tones. Other classical phase detectors rely on detecting "events" in their input signals, such as the occurrence of an edge or a level-crossing. These classical phase detectors only measure a phase difference between non-stationary signals. This is also the case in the prior art angle sensor architectures US2016/363638 and US2010/026287, in which a classical phase detector is used, having two input signals that change with time: a first one obtained by sequentially scanning a multitude of sensing elements at a predetermined scanning clock frequency, and a second one generated by an oscillator that has a related clock signal, e.g., the scanning clock, as an input. The phase detector operates by measuring the time between edges of the two distinct input signals. The multiple sensing elements are sequentially scanned and, hence, all individual sensing element signals remain available as a sequence of values, which in principle can be reversed. In contrast, in the present invention a parallel processing of the received sensor signals is adopted. For this purpose, the combiner circuit receives N>1 sensing signals at each instance in time and an equal number N of feedback signals (defining the weight of each sensing signal). Therefore, the combiner circuit receives at least four signals, while a classical phase detector only receives two signals. Furthermore, in the present invention the input signals may be completely static (DC) signals (which occurs when $\theta_i$ and $\theta_o$ are constant), and still the combiner circuit is able to provide an output representative for the difference between $\theta_i$ and $\theta_o$.

The various weights $G_k$ can be determined from the output angle by means of software-based calculations and/or by means of digital logic. In case the output angle is quantized, there is only a limited set of possible values. The various weights $G_k$ can be predetermined and, for instance, stored in a lookup table (81) (i.e., in digital form) in the feedback loop as in FIG. 2.

Figure 3:
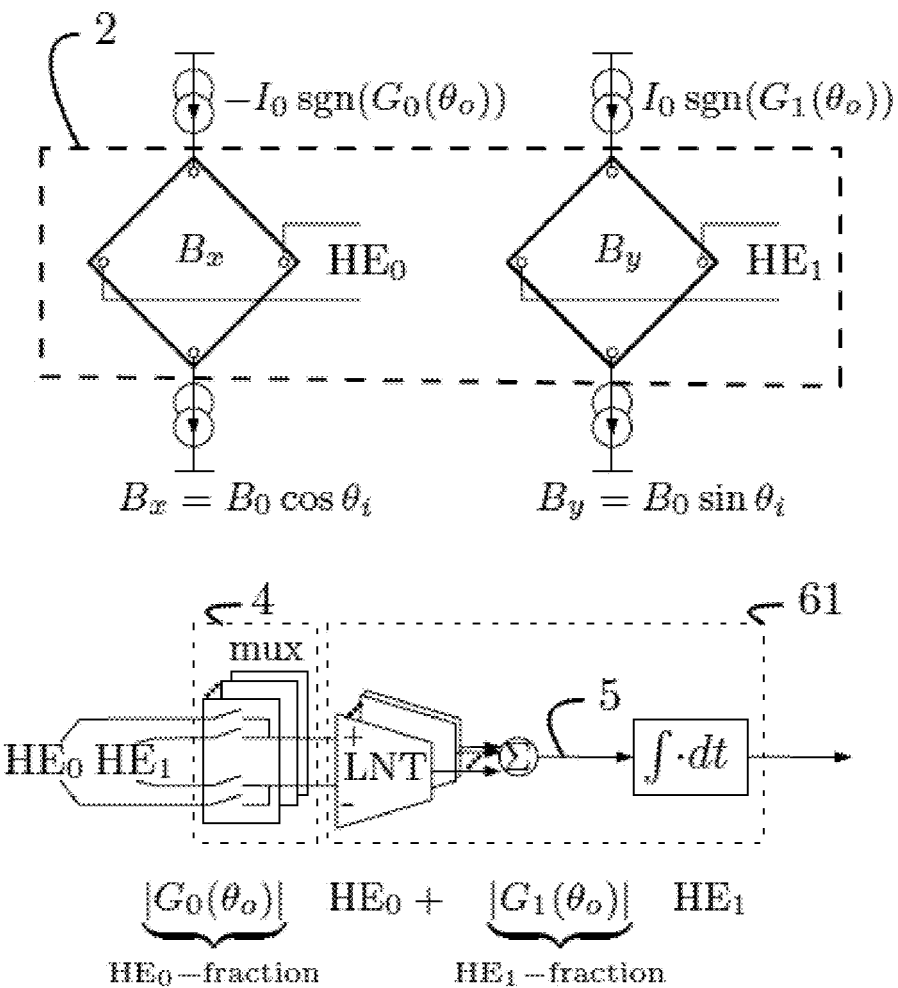
FIG. 3 illustrates a possible implementation of a digitally controlled gain.

The weights $G_k$ can be implemented as a digitally controlled gain (82) as in the embodiments of FIG. 2A and FIG. 2B. These weights may then represent gain factors (gain coefficients). There are various ways to implement such digitally controlled weights. The digitally controlled weights/gains in the combiner circuit may be realized by providing switchable components such as resistors, transconductances, capacitors, etc. The switchable components may be built using a common unit component. The digitally controlled weights/gains in the combiner circuit may also be realized by an analog multiplexer, e.g., for interconnecting one out of a number of sensing element signals to a component (resistor, transconductor etc.). The required functionality may also be merged with the next block of the system, which is in the exemplary angle-domain architecture of FIG. 2 an integrator. Conceptually, a voltage-domain integration can be split into a voltage-to-current conversion (i.e., a transconductance), followed by a current/charge integrator (typically using capacitors for accumulation of the charge associated with the input current). The digitally controlled weight can then for instance be realized by digitally controlling the transconductance with which the different HE signals are converted into a current. For instance, switches can be added to a transconductor circuit that allow controlling a conversion transconductance or (trans)resistance. In particular, one can devise switching schemes that rely on using identical unit components, since it is known that identical components are typically better matched. A possible approach of using unit elements for obtaining an integrator with accurately controlled weights is to split the total input transconductance of the integrator circuit into a number of identical (low-noise) transconductance units (LNTs), and using a digitally controlled analog multiplexer before each transconductance unit to select one out of a number of sensing element signals, the selection being dependent on the value of the output angle $\theta_o$. This is illustrated in FIG. 3, where the gain is digitally controlled by increasing or decreasing the number of transconductance units being used for converting the HE signals into current. In some cases one can also apply a zero signal to the unit or disable it in some way, e.g., when a certain unit is not needed for a particular output angle $\theta_o$.

The functionality of the feedback signal unit (8) may be expanded to generate control signals for setting the weights of the combiner circuit (4). These control signals may be a means for defining the state of all switches that affect these weights, and/or for defining the state of the multiplexers utilized in the combiner circuit. Two mappings may then be implemented in the feedback signal unit (8): a first one from the output angle $\theta_o$ to the weight coefficients $G_k$ and a second one from the weight coefficients $G_k$ to the control signals. It is also possible that a combined mapping is implemented in the feedback signal unit, in which the control signals are generated more directly as a function of the output angle $\theta_o$. While conceptually the connection between the feedback signal unit (8) and the combiner circuit (4) conveys information on the weight coefficients $G_k$, e.g., as shown in FIG. 1, the actual physical form of this link may take many different forms, such as digital signals defining the states of the controlled elements of the combiner circuit.

Figure 4:
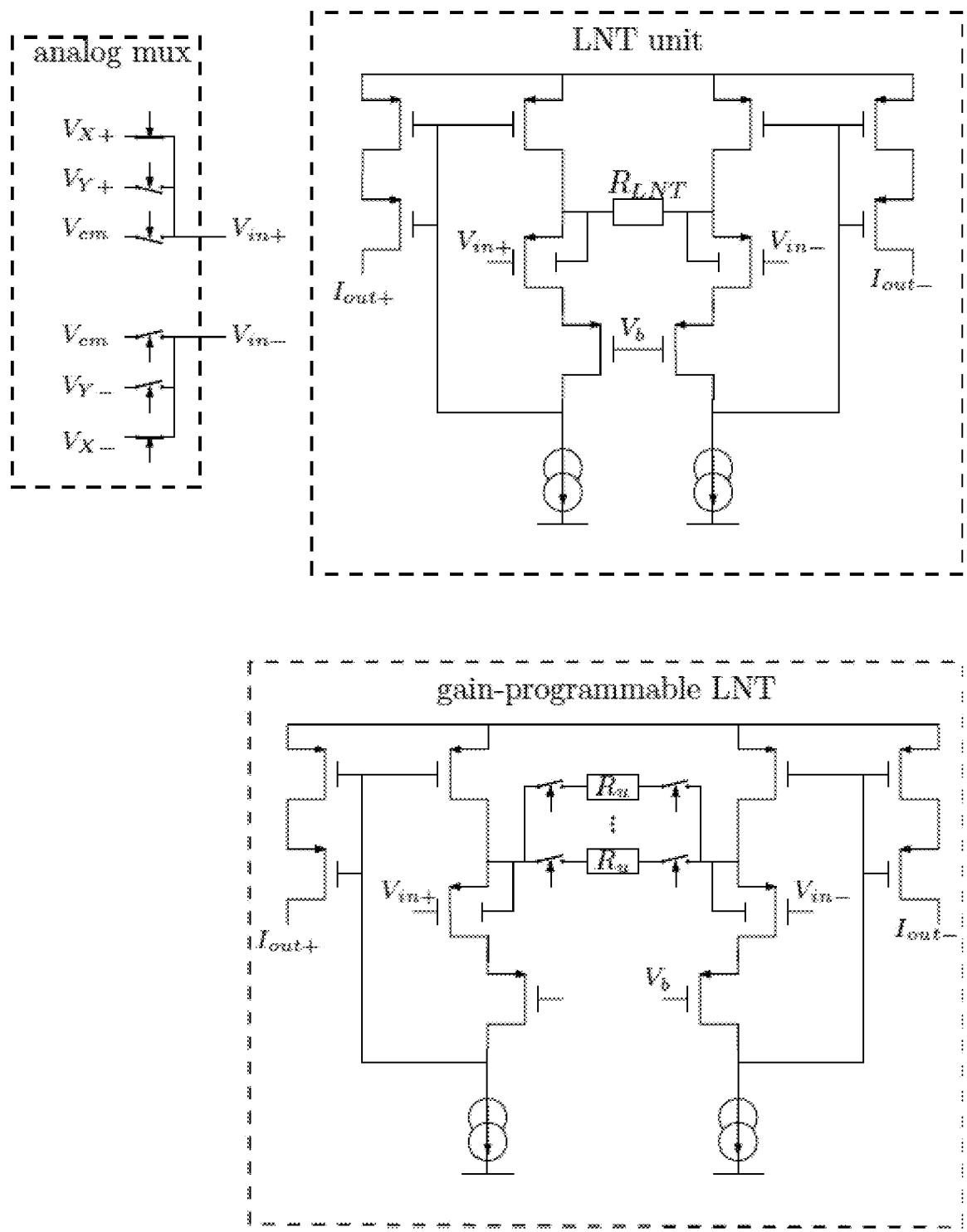
FIG. 4 illustrates more in detail a possible implementation of an analog multiplexer and switching components.

A more detailed view of the analog multiplexer and the switching components is provided in FIG. 4. This figure details a circuit-level implementation of an analog multiplexer that allows selecting one out of two possible differential sensing signals, being (VX+, VX−) and (VY+, VY−), and also allows selecting a zero differential signal by switching the multiplexer's differential output nodes (Vin+, Vin−) to a common voltage Vcm. The analog mux uses CMOS switches, which can be operated by digital control voltages defining the states of these switches. The analog mux output is connected to the input of a low-noise transconductor (LNT) unit. The LNT's input transistor receiving the differential voltage (Vin+, Vin−) and act as a source-follower for this differential input voltage. The differential input voltage is therefore also forced over the resistor $R_{LNT}$ and a signal-dependent current is generated. Other transistors in the LNT unit are there to improve the source-follower characteristic and to provide a (possibly scaled) copy of the signal-dependent current generated by the resistor $R_{LNT}$. At the bottom of FIG. 4 it is shown how the same type of circuit can be easily adapted to obtain a gain-programmable variant. In this, the $R_{LNT}$ is composed of a number of identical resistor units Ru and switches are inserted to put a certain number of these units in parallel. A series connection of resistors, with switches allowing to short-circuit some elements (not shown on the figure) could also be used to create a variable resistance $R_{LNT}$. It is clear that by controlling the resistance $R_{LNT}$ the circuit operates as a gain-programmable transconductance.

Embodiments of the combiner circuit may include any known technique used in integrated circuits design to compensate for component mismatch. This includes the use of calibration and/or trimming as well as the use of dynamic element matching techniques, e.g., allowing variation of the combination of units being used for realizing a particular weight factor.

The weights $G_k$ can be positive for some $\theta_o$ angles, but can be negative for other output angles. The sign of the weight $G_k$ can be implemented in a number of ways. For instance, when the sensing element signals are differential, the sign can be changed by swapping the connections. Alternatively, some sensing elements, like Hall elements, allow changing the sign by changing the bias current flow direction. This is also illustrated in FIG. 3. For single-ended sensing signals a sign reversal may be realized by an inverting amplifier configuration.

In practical circuit implementations the different weights can be more easily implemented if they can be composed from a number of identical units. In such cases the weight coefficients are necessarily quantized and may deviate from the theoretical values given above. As a result of this weight quantization, the combiner output may deviate from the ideal case and may become non-zero for input angles which ideally would give a zero output. Since the combiner output is interpreted in the architecture as an error between input and output angle, it can be understood that the weight quantization may have an impact on the overall accuracy of the sensor system. Fortunately, this can be remedied by shifting the output angle $\theta_o$ corresponding to a particular weight combination. The shifted value is defined as the angle $\theta_o$ which, when the same input angle is applied (i.e., $\theta_i = \theta_o$), makes the linear combination equal to zero. This method allows taking the effects of weight quantization into account by making (small) corrections to the output angle which would apply in the absence of weight quantization.

This can be easily done when the processing block comprises an angle quantizer block, since in this case the correction can be accomplished by a change of the allowed quantization levels. Simulations show that with such adaptations the system can operate satisfactorily, with the deviations having little or no impact on the performance. Of course, the angle quantizer block might become somewhat more involved. For instance, it is more complex to find a closest value in a non-uniform set of allowed values compared to a uniform set.

Figure 5:
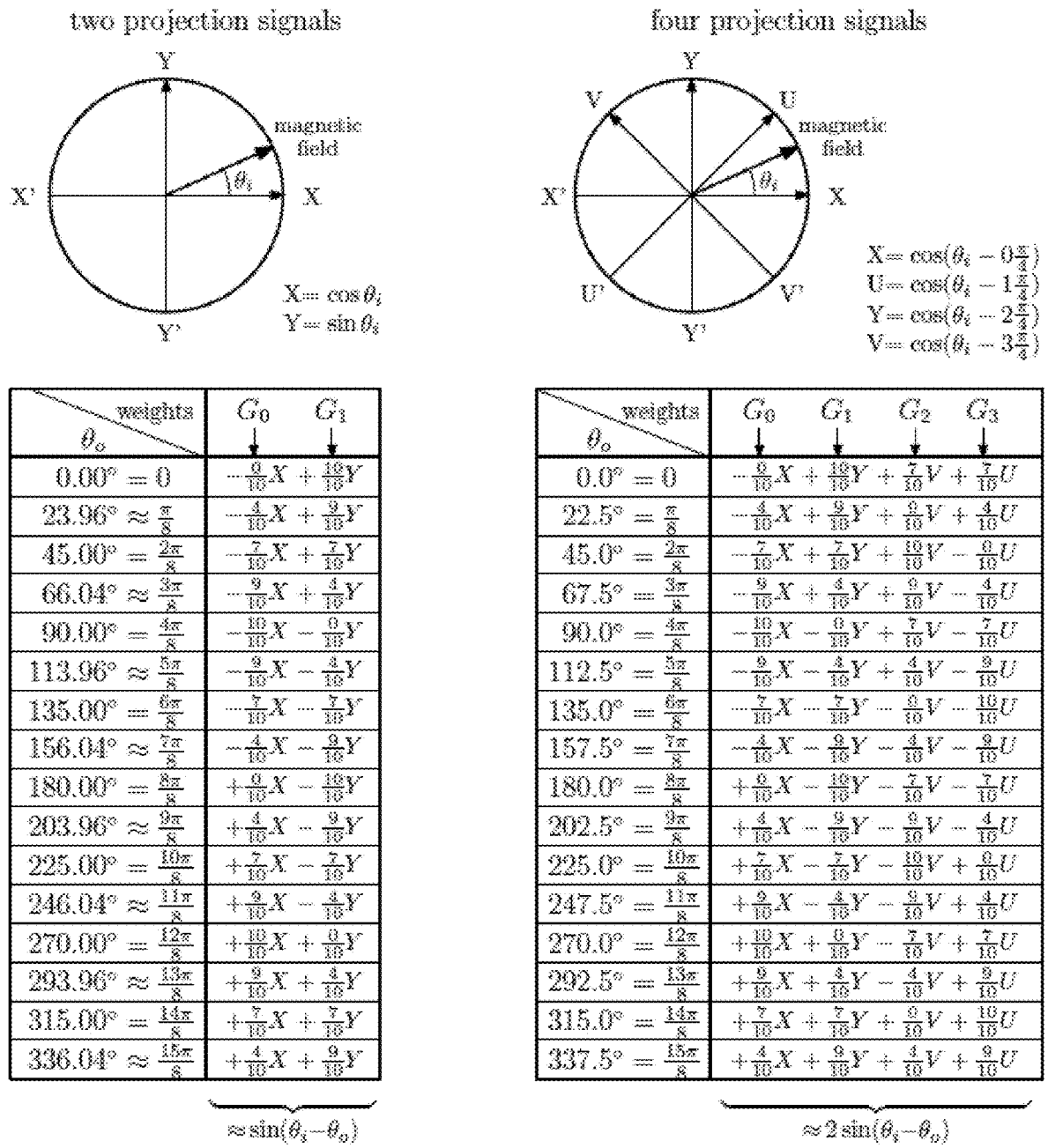
FIG. 5 illustrates practical weighting schemes with two and four projection signals, respectively.

In FIG. 5 two practical weighing schemes are presented that can be implemented with units and that still lead to correct system operation. In both schemes the above described corrections for eliminating the effects of weight quantization have been made and one can see that indeed not all the discrete output angles $\theta_o$ are perfect integer multiples of a single base angle. Surprisingly, when using more projection signals, e.g. the scheme shown on the right side of FIG. 5, the above corrections are not needed because the levels remain exactly at their theoretical value, in spite of the weights having been rounded to convenient values. Hence, the allowed output angles remain simple integer multiples of a base angle ($\pi/8$), which makes the angle quantizer block simpler to implement.

Additional methods for realizing weighting coefficients exist. E.g., in cases where Hall elements are used as sensing elements, it is possible to realize a weight factor by modulation of the HE bias currents (or bias voltages) in a way depending on the output angle. This offers the advantage that it is fairly easy to implement, e.g., using a current DAC for defining the bias current.

Combined solutions wherein distinct methods for introducing weighting coefficients are used together, are also possible. For instance, a digitally controlled gain by switching a number of transconductor units to particular sensor signals, can be adjoined with means to regulate the bias current (or voltage) of the sensing elements.

Analog Filter Comprising an Integrator

As illustrated in FIG. 2, in the processing block (6 an analog filter (61) comprising an integrator receives as its input the output of the combiner circuit (4) representative of an error signal, e.g., proportional to $\sin(\theta_i - \theta_o)$. As explained above, when in tracking mode, the error signal (5) is representative of the angle/phase error $\theta_i - \theta_o$. The integrator output, being the integral of this error signal, therefore represents an accumulation over time of the angle/phase error of the output relative to the input. Since the overall tracking loop can be made to operate in a stable way, the integrator state remains bound at all times. This implies that the average error becomes asymptotically zero as time progresses, which explains an important feature of the proposed architecture: the output angle is, on average, an accurate representation of the input angle.

It is not absolutely required to use an integrator for processing the angle/phase error signal. This may also be a (low-noise) amplifier that provides gain, or a more general class of analog low-pass filters. Another example is the addition of a series resistor in the feedback path of an integrator circuit to add a zero to the loop filter, e.g., for enhanced stability of the loop. In order to arrive at the abovementioned feature that the average output equals the average input, one or more integrations are needed in the forward path of the device, i.e., in the loop filter. However, these integrations can be performed in other blocks, e.g., in the digital filter(s) comprised in the loop filter as discussed later in this description.

However, the use of an analog low-pass filter, e.g., an integrator, for processing the error signal of the combiner circuit does bring some advantages. A first benefit relates to the broadband noise of the sensing elements. Because the combiner circuit combines the inherently noisy sensing element signals, the output (5) (i.e., the angle error signal) also contains broadband noise. A continuous-time low-pass filtering of the error signal suppresses this broadband noise. Due to this filtering effect, it is possible to sample the analog filter output with little extra noise aliasing. In other words, the analog integrator provides an implicit anti-aliasing filtering. This is advantageous when the analog filter is followed by a sampling block, such as an ADC (see the embodiment of FIG. 2) or a switched-capacitor circuit (e.g., for extra gain, additional filtering, . . . ). A second advantage is that the analog filter (61), especially when it comprising one or more integrators, provides noise shaping for quantization noise sources present in the loop e.g., caused by the angle quantization block, and/or the ADC (when present). A third advantage is that the analog filter provides gain (and noise filtering) with little extra propagation delay.

Some sensing elements, such as Hall elements, have relatively large intrinsic offsets, in which case current spinning is often applied to separate the useful magnetic signal from the offset. It is possible to choose the current spinning scheme such that the useful signal is up-converted, arriving at a chopped sensor signal. Instead of expression (1), the sensing signals may be represented with the use of spinning/chopping as $$S_k(\theta_i) = (-1)^n A\cos\left(\theta_i - k\frac{2\pi}{N}\right) + V_{o,k} \quad k = 0, 1, \ldots, N-1 \tag{7}$$

in which $(-1)^n$ denotes the alternating Hall signal due to the applied spinning scheme (with n an integer indicating the $n^{th}$ time slot during which sensor signals are being read out) and $V_{o,k}$ the individual offset of sensing element k. This "chopped" sensor signal is then connected to the front-end, e.g., to one or more LNT units in FIG. 3. So, the signals processed by the combiner circuit can be composed of an offset and possibly some flicker noise on the one hand and on the other hand the up-converted magnetic signal. The combiner circuit output then needs to be demodulated prior to integration. This demodulation prior to integration can be seen in the sensor system of FIG. 6 as a second factor $(-1)^n$.

In an inductive based position sensor the chopping operation may be due to the modulation at high frequency used in the excitation coil. The $(-1^n$ might correspond to the use of an analog carrier or to demodulation with such a carrier.

While the proposed architecture is compatible with applying chopping in the front-end, this is not mandatory. For instance, the sensing signals can already have very good signal strength compared to possible offsets, as may be the case when using an electrical resolver for providing the sensing signals. Furthermore, flicker noise from the front-end can also be reduced by appropriate design (e.g., increasing the size of critical transistors).

ADC and Digital Filter

For applications which have rotations in the same direction over long time periods (e.g., in motor control), the output angle in principle continuously increases. This might cause a problem when the output angle is represented by an analog signal with limited range. A solution to this problem is to reset the analog signal, e.g., to zero, when some upper limit is reached. When the upper limit corresponds for instance to an output angle of 360°, a reset to zero then corresponds to performing a 360° phase jump to keep the analog signal into its limited range. However, if such operations are performed in the analog domain, they are subject to various errors and imperfections. As described hereafter, this can be circumvented, e.g., by phase accumulation in the digital domain and performing the phase-wrapping in a much more ideal setting.

More generally, particular embodiments of the angle sensor have a loop filter comprising digital filtering. The (total) loop filter then for example comprises an analog filter, an analog-to-digital converter and a digital filter. Using digital filters has many advantages over analog counterparts, e.g., in terms of transfer function accuracy, flexibility and scalability with technology. The digital filter (63) may comprise an integrator, for instance for accumulating a speed related signal (as is the case in FIG. 2). The advantage of using a digital integrator is that these can have a nearly unlimited output range, thus providing a sensor architecture with multi-turn capabilities. Also, integrators with limited output range are very useful, e.g., providing an error-free implementation of the above-mentioned phase jumps. In its simplest form the natural overflow of the digital integrator may provide an error-free phase-wrapping mechanism. As an example of the above it is possible to have the digital integrator to have an output range of 800° where the most significant bits of the digital integrator define the number of revolutions and a high number of less significant bits define the angle within a single revolution with high accuracy, e.g., a 14-bit output where two bits are used for the number of revolutions and 12 bits for the fractional angle.

Arrangements for measuring an absolute angle using a multi-pole magnet have been worked out, e.g., in US2015/226581. These arrangements have the advantage that they significantly decrease the sensitivity w.r.t. stray fields. It is an advantage of present invention that the sensor readout architecture is compatible with the use of multi-pole magnets and/or stray-field insensitive sensor arrangements.

Figure 7:
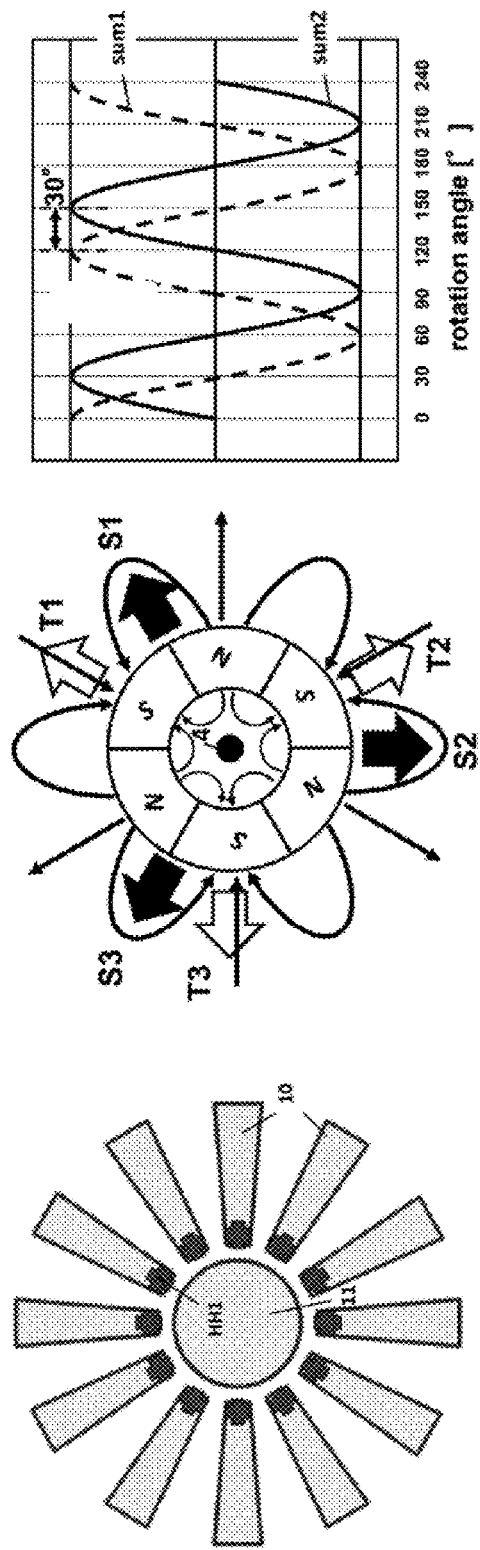
FIG. 7 illustrates a stray field robust arrangement for use with a 6-pole magnet.

FIG. 7 shows an exemplary stray field robust arrangement for use with a 6-pole magnet disclosed in US2015/226581, which is taken as an example here. The individual sense signals can in this situation be modeled as:

$$HE_k = A\cos\left(\theta_i - k\frac{2\pi}{12}\right) \quad k = 0, 1, \ldots 11 \tag{8}$$

With $$\theta_i = 3 \times \theta_{mech} \tag{9}$$

whereby $\theta_{mech}$ represents the absolute rotation angle of the 6-pole magnet. The main difference with expression (1) is that now the sensed (magnetic) angle $\theta_i$ is an integer multiple of the "mechanical" angle $\theta_{mech}$. Note that the relation between $\theta_{mech}$ and $\theta_i$ according to (9) assumes that for $\theta_{mech}$ equal to zero, the magnet and sensing element configurations are properly aligned. If this is not the case, an extra offset angle can be added to the equation.

Figure 6:
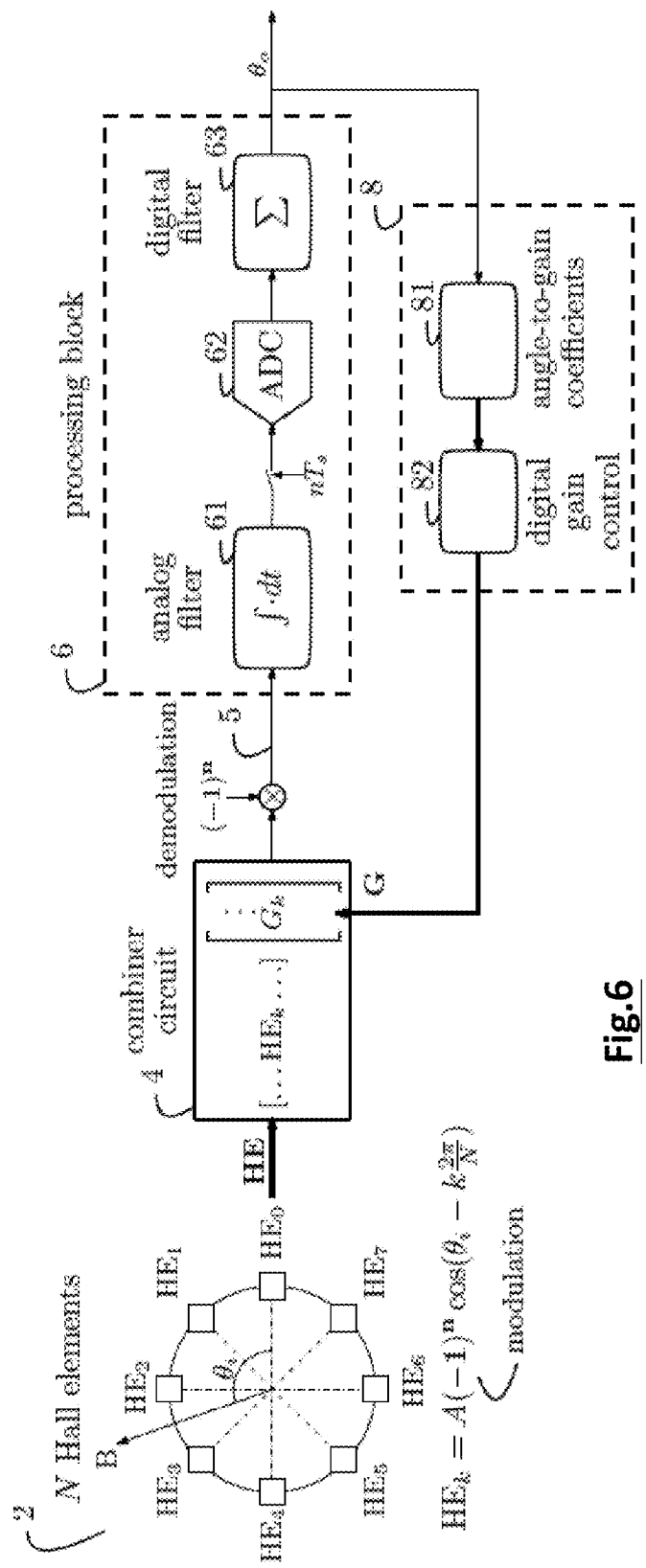
FIG. 6 illustrates an embodiment of the position sensing device wherein a spinning scheme is applied.

The sensor device of the present invention can provide a readout with improved insensitivity to stray fields by using symmetric weights. For the above example, imposing the symmetry constraints $G_k=G_{k+4}=G_{k+8}$ for k=0, 1, 2, 3 leads to the desired result. For instance, because a common factor $G_1=G_5=G_9$ was chosen, the contribution of the signals from sensing elements $S_1$, $S_2$ and $S_3$ indicated in FIG. 6 is the sum of these signals weighted by the common factor, and therefore the influence of a uniform stray-field drops out (because of the summation).

In general, when sensing elements are placed in a regular pattern and when the signals of a subgroup of these elements can be combined to make the readout robust w.r.t. an interferer (e.g. an interfering external magnetic field), in the combiner circuit the weights/gains associated with the subgroup elements are chosen such that for all possible cases (i.e. all possible output angles) the subgroup signals are combined in a way that retains the robustness w.r.t. the interferer. This includes situations where sensing elements are Hall plates spaced at the corners of a regular polygon: signals from diametrically opposing plates (e.g., X and X') can be taken to have weights/gains with matched magnitudes and a sign appropriate to block a uniform external field in a direction perpendicular to the Hall element.

Another advantage of present invention when combined with multi-pole magnets relates to the multi-turn capabilities of the loop. The sensor device tracks $\theta_i$, even when increasing/decreasing beyond 360°. Taking the 6-pole magnet again as an example, if (9) is valid at some point in time, the loop will from there on track $\theta_i$ even if $\theta_i$ goes beyond 360°. As long as the loop is not thrown out of lock, the relation (9) remains valid. Therefore, a measurement of the mechanical angle can be obtained as $$\theta_{mech} = \frac{1}{3} \times \theta_o \quad (10)$$

Note that without a means for making a correspondence between $\theta_i$ and $\theta_{mech}$ at some point in time, there remains an overall ambiguity on the measured angles due to the 120° rotational symmetry of the magnet. This ambiguity can be resolved, e.g., by detecting (with other means) when $\theta_{mech}$ is in a relatively large but known range, e.g., between −60° and +60°.

Angle Quantizer

In the description the focus is mostly on the quantizer block (64) operating on an angle. It should be clear however that the quantizer block (64) operating may also operate on a phase representative of a (generalized) position.

The angle quantizer block (64) associates with an input value an output value from a finite set of allowed values. The selected output value may be the allowed value closest to the input value. The simplest case is when the allowed values are uniformly distributed. When an ADC is used in the loop, the angle quantizer block may be a purely digital function. A particularly simple form is based on identifying the "fractional bits" of the digital filter (63) output or a phase accumulator output, i.e., the bits which determine the angle as a fraction of a full circle. The angle quantizer limits the number of levels of the output angle $\theta_o$ for covering a full circle, e.g., a number in the range 2 to 1024 or in the range 4 to 64 or in the range 6 to 32 or in the range 8 to 16 levels (in each case limiting values inclusive).

The angle quantizer may also be an analog circuit having an analog input, e.g., a comparator, a flash ADC or other types of Nyquist-rate ADCs. In practice, this requires the output position range to be finite and extra measures may need to be taken, e.g., for wrapping the input angle of the angle quantizer to a basic range covering only 360°.

Embodiments of the position sensor which comprise a quantizer block (64) provide a digital output representative of the position, corresponding to the quantizer output. These embodiments therefore provide a position-to-digital conversion. The number of bits taken for the quantizer (64) is influenced by two important factors. On the one hand, decreasing the number of bits reduces the complexity of the combiner circuit, making the position sensor easier to implement. On the other hand, a high number of bits provides more resolution for the digital output value of the (generalized) position. It will now be shown that these conflicting requirements can be alleviated by a "noise cancelling" technique in which the quantization noise introduced in the quantizer (64) of the position sensor is largely eliminated.

Figure 8:
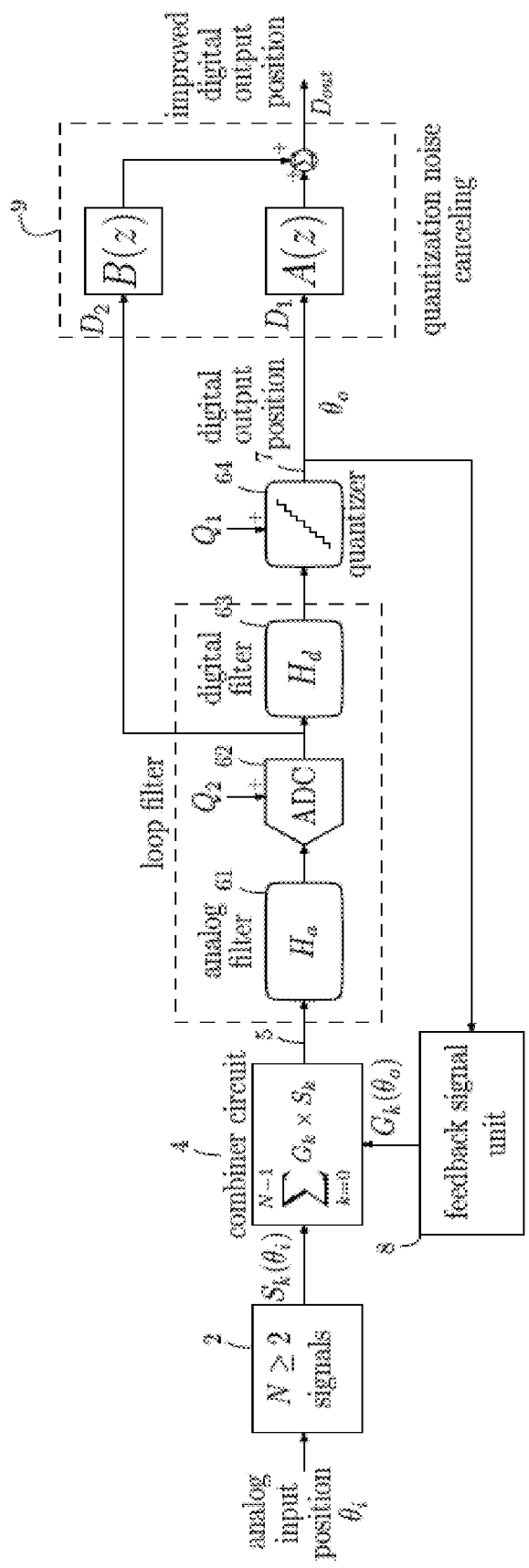
FIG. 8 illustrates a position sensor providing an A/D conversion of the input angle according to the invention with improvement of the digital output through cancelation of the quantization noise.

A scheme with noise cancelling according to the present invention is shown in FIG. 8. The quantizer (64) provides a digital output value (7) of the loop, denoted as $D_1$ in subsequent calculations. This quantizer may typically have a limited number of bits, e.g., for reducing the complexity associated with the combiner circuit (4). The quantizer (64) is in the digital domain and its input is provided by a digital loop filter having a transfer function $H_d$. The loop further comprises an analog loop filter having a transfer function $H_a$ followed by an analog-to-digital converter. As the output of the analog loop filter is sampled by the analog-to-digital converter, the transfer function $H_a$ is taken as the discrete-time equivalent of the continuous-time transfer of the analog loop filter. Determining such a discrete-time equivalent is well known in the field and can for instance be done by the c2d function provided in Matlab. The analog-to-digital converter provides a digital output, denoted as $D_2$ in subsequent calculations, which also provides the input of the digital loop filter $H_d$. The operation of the quantizers can be modelled as adding a quantization error to the respective quantizer input signal, the quantization error being defined as the difference between the output and the input of the quantizer. Two such extra "sources" can be identified in the system, being $Q_1$ and $Q_2$ representing the quantization error of the quantizer (64) and the analog-to-digital converter (62), respectively. Note that $Q_1$ may be considered a knowable quantity in the present system, since both the input and the output of the quantizer (64) are in the digital domain and, hence, these signals can be digitally subtracted to obtain $Q_1$. Since perfect knowledge of $Q_1$ can be obtained, it becomes possible to compensate for the effects caused by quantization noise $Q_1$ of the quantizer (64). A key question is of course how to do this and to what extent this is possible when there are uncertainties in the system, such as when one has only imprecise knowledge of the analog filter transfer function $H_a$. One possibility is to use the output $D_2$ of the analog-to-digital converter circuit of the present invention, when present, to largely eliminate the effects of $Q_1$. Some embodiments disclosed further on are capable of coping with imprecise knowledge of the analog filter transfer function $H_a$, and even allow adapting to time-varying changes in this filter.

Using linear system analysis, the two digital outputs $D_1$ and $D_2$ in the above system can be determined as a function of the input signal $V_i$ and the two quantization error sources $Q_1$ and $Q_2$:

$$\begin{cases} D_1 = STF \cdot V_i + NTF \cdot Q_1 + H_d \cdot NTF \cdot Q_2 \\ D_2 = \dfrac{STF}{H_d} \cdot V_i - H_a \cdot NTF \cdot Q_1 + NTF \cdot Q_2 \end{cases} \quad (11)$$

In this expression the following transfer functions appear:

$$\begin{cases} STF = \dfrac{H_a H_d}{1 + H_a H_d} \\ NTF = \dfrac{1}{1 + H_a H_d} \end{cases} \quad (12)$$

These transfer functions are known in the context of Sigma-Delta modulators as the signal transfer function (STF) and the noise transfer function (NTF).

In accordance with the present invention, the two digital quantizer outputs $D_1$ and $D_2$ go to a recombiner block where these are filtered by digital filters A(z) and B(z), respectively, and then added. As detailed below, a delay compensation filter can optionally be provided as well. The thus obtained recombined output $D_{out}$ can be expressed as:

$$D_{out}(z) \triangleq A(z)D_1(z)+B(z)D_2(z) \quad (13)$$

Substituting expression (11) in (13) it can be easily shown that if $$\frac{A(z)}{B(z)} = H_a \quad (14)$$

then $$D_{out}(z) = A(z)\left(V_i + \frac{1}{H_a(z)}Q_2\right) \quad (15)$$

Since $Q_1$ does not appear in the compensated output $D_{out}(z)$, the proposed recombination has completely eliminated the contribution of $Q_1$. It is, however, shown later in this description that it is not strictly needed that the ratio of the transfer functions of the digital filters A(z) and B(z) exactly equals $H_a$.

In accordance with the present invention, other means to eliminate the quantization noise $Q_1$ can be applied. The output $D_1$ of the quantizer (64) has an additive term NTF(z)$Q_1$, as can for instance be seen from expression for $D_1$ in (11). The quantization noise $Q_1$ can be readily determined, e.g., by subtracting the input of the quantizer (64) from its output, which are two signals readily available in the digital domain. This method to determine $Q_1$ is also used in FIG. 12 which will be discussed below. Now, eqn. (12) provides an expression for the digital transfer NTF(z) in terms of the discrete-time equivalent $H_a$(z) of the analog filter in the loop and the also known transfer $H_d$(z) of the digital filter in the loop. Therefore, NTF(z) represents a known digital filter, which can be applied to the sequence of $Q_1$ values (e.g., obtained from subtracting the input of the quantizer from its output), and the result can be subtracted from the quantizer output (64) $D_1$ to arrive at a position output. The so obtained output $D_{out}=D_1-NTF(z)Q_1$ can be shown to be no longer dependent on the quantization noise $Q_1$, as can be straightforwardly demonstrated based on eqn. (11). In reality the (discrete-time equivalent) transfer $H_a$(z) of the analog filter used in determining NTF(z) may deviate from the true transfer because of the unavoidable variability of the analog filter e.g., with temperature. In spite of this, it is easily attainable with the above described canceling method to produce a value $D_{out}$ representative of a position to be measured with reduced dependence on the quantization noise $Q_1$ caused by the quantizer (64).

Above two distinct methods for noise-canceling have been described. In both cases there is a noise canceling block having two digital inputs: the quantizer output signal and a digital signal upstream of the quantizer. These two digital signals are combined in the noise canceling block in such a way that the combined signal provides an improved phase value representative for the position to be measured which is less dependent on quantization noise caused by the quantizer. In the first approach the digital signal upstream of the quantizer used in the noise canceling block is the output of the analog-to-digital converter comprised within the loop filter. The combined signal is obtained by appropriately filtering both digital signals using digital recombination filters A(z) and B(z), and subsequently adding the outputs of the recombination filters. In the second approach, the digital signal upstream of the quantizer being used in the noise canceling block is the input signal of the quantizer. The combined signal is obtained by subtracting the two digital signals received by the noise canceling block, filter this (with an approximation of the NTF), and subtract this from the quantizer output signal (also received by the noise canceling block). Based on the noise canceling methods disclosed in the present invention, a skilled person can in principle extend the approach to use a different digital signal appearing in the loop upstream of the quantizer, e.g. by using linear system analysis for deriving an equation similar to (11) for the digital signal appearing in the loop upstream of the quantizer, and then work out a linear combination of the two digital input signals of the noise-canceling block that eliminates the contribution related to $Q_1$.

The advantage of the noise cancelling scheme is that the quantizer (64) may have a low resolution (i.e., a low number of bits), because the corresponding quantization error $Q_1$ can be eliminated in the above explained manner. This way, the number of feedback levels may be restricted, which can significantly simplify the design of the combiner circuit.

Another advantage offered by the invention can be understood by observing the transfer of the input position to the digital output. For the digital noise-cancelled output, this transfer is A(z). When using $D_1$ as digital output (without noise-cancelling), the signal transfer function is STF(z) as defined in (12). This STF(z) is fixed by the choices for the analog and digital loop filters $H_a$ and Ha, respectively. In contrast, it can be seen that (14) allows much freedom in selecting the recombination filters A(z) and B(z). It is therefore possible to exploit this freedom to arrive at a more beneficial signal transfer function A(z).

In general, the interconnection complexity of the combiner circuit reduces when the number of bits of the angle quantizer is lowered. A small number of bits implies a larger angle quantization error, and the strategy to deal with angle quantization error as disclosed in present invention is therefore highly relevant.

An important quantity is the delay n—expressed as a number of sample intervals (T)—between the digital feedback signal ($D_1$) and the digital output of the ADC ($D_2$). Contributions to this delay may come from a delay in the feedback path, a delay associated with the integrator circuit, the conversion time of the ADC, etc.

Figure 9:
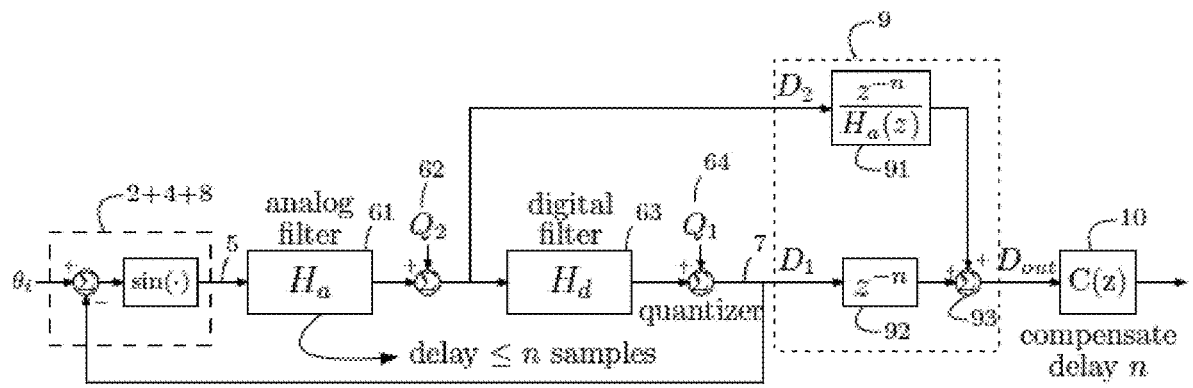
FIG. 9 shows a behavioral model of the position sensor of FIG. 8 and illustrates a possible choice for the recombination filters A(z) and B(z) when the analog filter Ha introduces delay, and the use of a delay-compensating filter C(z).

The more compact system-level diagram of FIG. 9 can then be derived for the system as described. In the present example the action of the N input signals (2), the feedback signal unit (8) and the combiner circuit (4) produces an output signal (5) proportional to the sine of the difference between input angle and the feedback angle corresponding with $D_1$. For studying transfer functions, the non-linear sin characteristic is neglected, that is, it is assumed sin x≈x with x sufficiently small. In the system level diagram the (total) delay n has been included in the analog filter transfer function $H_a$, while the feedback path and the quantizer (64) are idealized as having no delay. In the considered exemplary case, the analog filter has a transfer function given by $$H_a = K \frac{z^{-n}}{1-z^{-1}},$$

with K a proportionality factor accounting for a multitude of scale factors (such as the magnetic field strength, the Hall element sensitivity, the time constant of the integrator, etc.).

In this exemplary embodiment the recombiner block uses the following recombination filters:

$$\begin{cases} A(z) = z^{-n} \\ B(z) = \dfrac{z^{-n}}{H_a(z)} \end{cases} \quad (16)$$

For this choice the condition (14) is obviously met. The reason why the extra delay $z^{-n}$ is introduced, is to make the filter B(z) physically realizable. For this example one obtains $$B(z) = \frac{1-z^{-1}}{K},$$

which represents a realizable FIR filter.

The choice $A(z)=z^{-n}$ implies that the input signal is also delayed by n samples, which can be seen from (15). In case of angular sensors operating at high rotation speeds, this extra delay may cause noticeable angle errors, especially if n>1. In such cases, an optional delay compensation filter may be added to the system whose purpose is to compensate the delay n of the filter A(z). One example of a compensation filter for compensating a delay n is:

$$C(z) = 1 + \frac{a(1-z^{-1})}{1-\left(1-\dfrac{a}{n}\right)z^{-1}} \quad (17)$$

Figure 10:
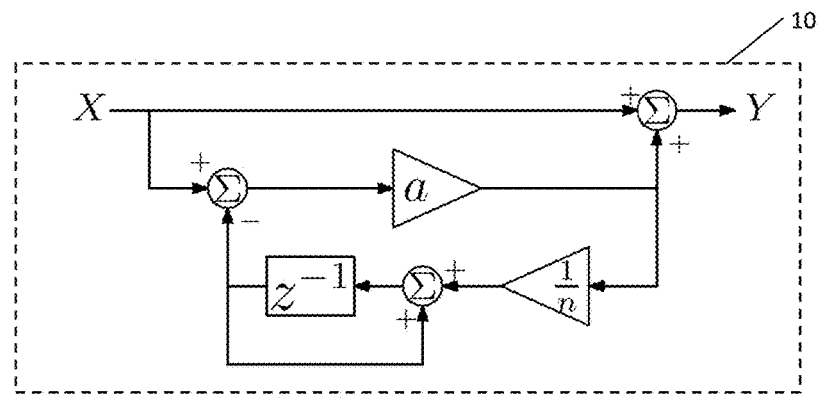
FIG. 10 illustrates two possible implementations of a delay compensation filter.

One way to realize this filter is shown in FIG. 10. In (17) a denotes an extra parameter, typically between zero and one, to control the trade-off between overshoot and high-frequency gain (which becomes smaller when a is lowered) on the one hand and on the other hand the settling time (which becomes smaller when a is increased). When choosing a=n, the filter reduces to $1+n(1-z^{-1})$, which is an intuitive way for compensating delay based on a 'speed' estimate by differencing the signal, but this choice has a very high overshoot and strongly amplifies high frequencies.

As explained before, the input signal transfer function has been changed to the transfer A(z) of the first recombination filter, possibly with the delay thereof being compensated by a delay compensation filter. This is particularly interesting for angular sensors which provide an A/D conversion of a possibly fast-changing angle, because it allows improving the dynamic response, e.g., by providing a faster step response.

As also explained above, the position sensing device with noise-canceling using the recombiner block as described may comprise a delay compensation filter to compensate for a delay introduced by the first recombination filter. However, also in other situations, a delay compensation filter can be used advantageously. In general, additional digital filtering may be added to any of the exemplary embodiments of present invention, e.g., for increasing the signal-to-noise ratio by reducing the (noise) bandwidth. If such filtering incurs extra delay that cannot be tolerated in the envisioned application, this delay can be compensated, e.g., using the above type of delay compensation filter.

Figure 11:
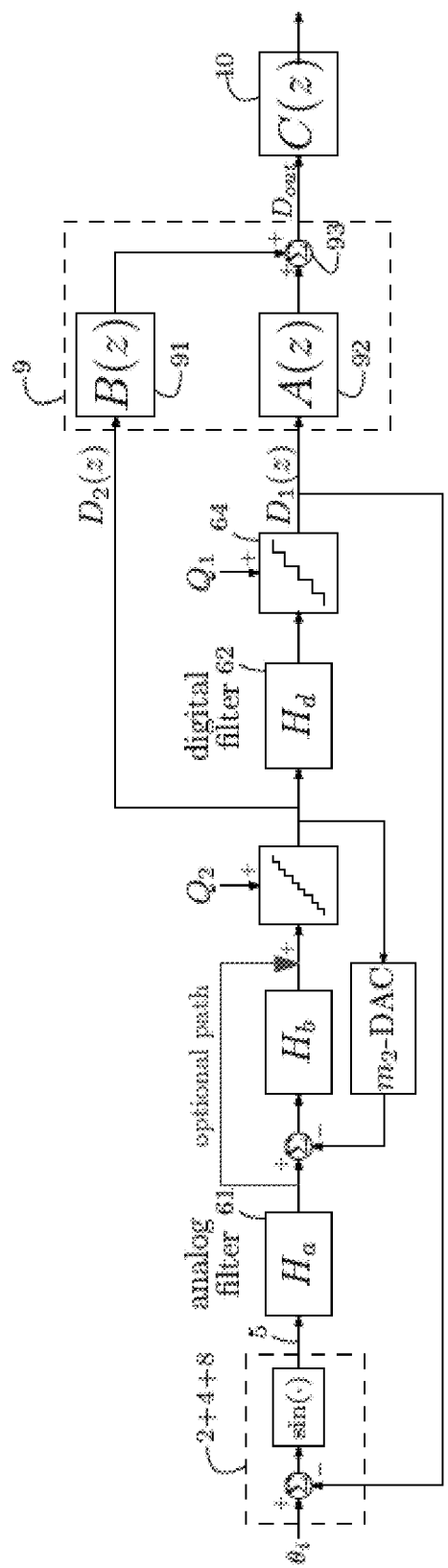
FIG. 11 illustrates an embodiment with inner-loop noise shaping applied for the analog-to-digital converter.

FIG. 11 shows an embodiment of the position sensor according to the invention wherein inner-loop noise shaping is applied. In this case, the analog-to-digital converter (62) is implemented as a local feedback loop in which a second quantizer $Q_2$ is embedded in an internal feedback loop, having an analog loop filter with transfer function $H_b$, and a local feedback DAC. The dynamics of the local loop is dictated by its signal transfer function $H_b/(1+H_b)$. For a first-order filter $H_b=z^{-1}/(1-z^{-1})$ this signal transfer function is a simple delay $z^{-1}$. This simple delay can be directly incorporated in the total delay n of the global feedback loop. The delay may also be avoided by adding the optional path shown on the figure. This optional path has the known effect that it makes the signal transfer function of the local loop equal to one. In such cases the local loop does not alter the dynamic behavior of the global feedback loop. The main effect of the local loop is therefore that it applies noise-shaping to the quantization noise $Q_2$ of the second quantizer. The equivalent quantization noise of the inner loop is $Q_2/(1+H_b)$, which is at low to intermediate frequencies typically considerably lower compared to the quantization noise $Q_2$ of the second quantizer used as a flash-ADC for analog-to-digital conversion (62).

An additional advantage of the system with inner-loop noise-shaping is that the non-linearity of the local feedback DAC is suppressed by the global loop. This means that multi-bit DACs can be applied with less stringent conditions on the linearity.

It is not required that both quantizers $Q_1$ and $Q_2$ operate at the same rate. For instance, the inner feedback loop around $Q_2$ and possibly also the digital filter with transfer function $H_d$ may be operated at a higher rate compared to the global feedback loop. The quantizer (64) then subsamples the digital filter output $H_d$.

In electronic systems process, supply voltage and temperature (PVT) are important sources of variability. The analog filter transfer $H_a$ is typically affected by these PVT effects. For instance, a continuous-time integrator—a particular choice for the analog filter—can easily have a time constant which deviates 30% from its nominal design value. Even larger deviations may exist. For instance, in most position sensors according to present invention, the magnitude of the weighted sum signal (5) depends on an amplitude of input signals, which typically depend on the strength of the magnetic field that depends on the application. In the model of FIG. 9, therefore various variable factors exist which affect the gain of the analog filter transfer $H_a$.

Some embodiments with adaptive schemes are now presented that can provide effective cancellation of $Q_1$ even in view of variability of the analog transfer function $H_a$. First, the impact of mismatch is discussed.

The condition (14) links two digital filters to an analog transfer function $H_a$. Because the analog transfer function is subject to various sources of variability, the equation is in general not met exactly. In order to investigate the impact of mismatch between the real $H_a$ on the one hand, and the nominal transfer used for the choice of the digital recombination filters $H_{a,nom}=A(z)/B(z)$ on the other hand, the relative mismatch may be defined as $$\Delta(z) = \frac{H_a(z)}{A(z)/B(z)} - 1 \quad (18)$$

Note that $\Delta(z)$ is identical zero if and only if the condition (4) is met.

Consider, as an example, an uncertainty in the gain K of the analog transfer $H_a$, which deviates from the nominal value $K_{nom}$ that is used for sizing the recombination filters A and B. Then, in this case (18) reduces to $$\Delta = \frac{K - K_{nom}}{K_{nom}},$$

i.e. $\Delta$ then represents a measure for the relative deviation of K from $K_{nom}$.

Taking into account a relative mismatch (8), an analysis as set out above can be made. The compensated output $D_{out}$ is then:

$$D_{out}(z) = A(z)\left\{[1 + \Delta(z)NTF(z)]\left(V_i + \frac{1}{H_a(z)}Q_2\right) - \Delta(z)NTF(z)Q_1\right\} \quad (19)$$

As expected, this equation reduces to expression (15) when $\Delta=0$. From (19), it can be deduced that the noise-cancelled output signal $D_{out}$ as provided by the present invention has a signal transfer function A(z) $[1+\Delta(z)NTF(z)]$. A minor effect of a non-zero $\Delta$ is that it somewhat alters the transfer A(z) of the input signal $V_i$ with an extra factor $1+\Delta(z)NTF(z)$. This can in most cases be neglected. In any case the signal transfer function A(z) can be chosen more freely compared to the "classical" output $D_1$ which has a signal transfer function determined by the loop filters. More important for present application are terms in (19) related to $Q_1$. From the last term of the above expression, it can be seen that a non-zero $\Delta$ leads to leakage of $Q_1$ noise into the compensated output $D_{out}$. Luckily, this leaked noise is shaped by NTF(z), which is the noise shaping created by both the analog filter $H_a$ and the digital filter $H_d$. When referred to the input, the leaked quantization noise is given by $\Delta(z)NTF(z)/(1+\Delta(z)NTF(z))Q_1$. For the "classical" output $D_1$ of the feedback loop as given by the first expression of (11), one has the input-referred contribution NTF(z)/STF(z)$Q_1$. The former is preferably smaller in some sense than the latter, which can only be the case when the relative mismatch $\Delta$ is restricted in some way. The following theorem can be proven: If for a definite frequency f one has that $$|\Delta(z)|<1/(|STF(z)|+|NTF(z)|) \text{ with } z=\exp(j2\pi f) \quad (20)$$

then the magnitude of the input-referred $Q_i$ noise at frequency f is smaller for the noise-cancelled output signal $D_{out}$ compared to the magnitude of the input-referred $Q_1$ noise when using the "non-cancelled" output $D_1$. Note that (20) is not a necessary condition, but merely provides a convenient sufficient condition. Fortunately, equation (20) is in most cases not very restrictive and relative mismatches A in the order of a few percent, even 10% and more are likely to agree with (20). Furthermore, if (20) is met for all frequencies f, it is guaranteed less input-referred $Q_1$ noise is present in $D_{out}$ compared to $D_1$. However, even if expression (20) would be violated for some frequencies, it is still possible that the integrated power of the leaked quantization noise is smaller than the integrated power of the quantization noise $Q_1$ present in the "non-cancelled" output $D_1$. In other words, if there is more $Q_1$-related noise at some frequencies this can be offset by less noise being present at other frequencies. Therefore, it can be concluded that a very broad range of recombination filters A(z) and B(z) exist which result in the "noise-cancelled" output $D_{out}$ being less dependent on the quantization noise $Q_i$ compared to the "none-cancelled" output $D_1$ of the feedback loop. The latter may be quantified by comparing the signal-to-noise ratio (SNR) of $D_{out}$ to the SNR of the "non-cancelled" output $D_1$. While the recombination filters A(z) and B(z) may be chosen starting from (14) and taking into account the design freedom indicated by (18) and (19), other design procedures are also possible. For instance, one may A(z) and/or B(z) to be parameterized filters, e.g., an FIR filter with variable coefficients, and then determine the optimum filter parameters which maximize the SNR of $D_{out}$. When the optimum SNR of $D_{out}$ turns out to be lower than the SNR of $D_1$, a choice is obtained for A(z) and B(z) that by construction provides a noise-cancelled output $D_{out}$ being less dependent on the quantization noise $Q_1$ compared to the "non-cancelled" output $D_1$ of the feedback loop. Such an optimization approach also provides extra flexibility for introducing a signal transfer function (corresponding to the recombination filter A(z), as explained above) of a preferred form.

Figure 12:
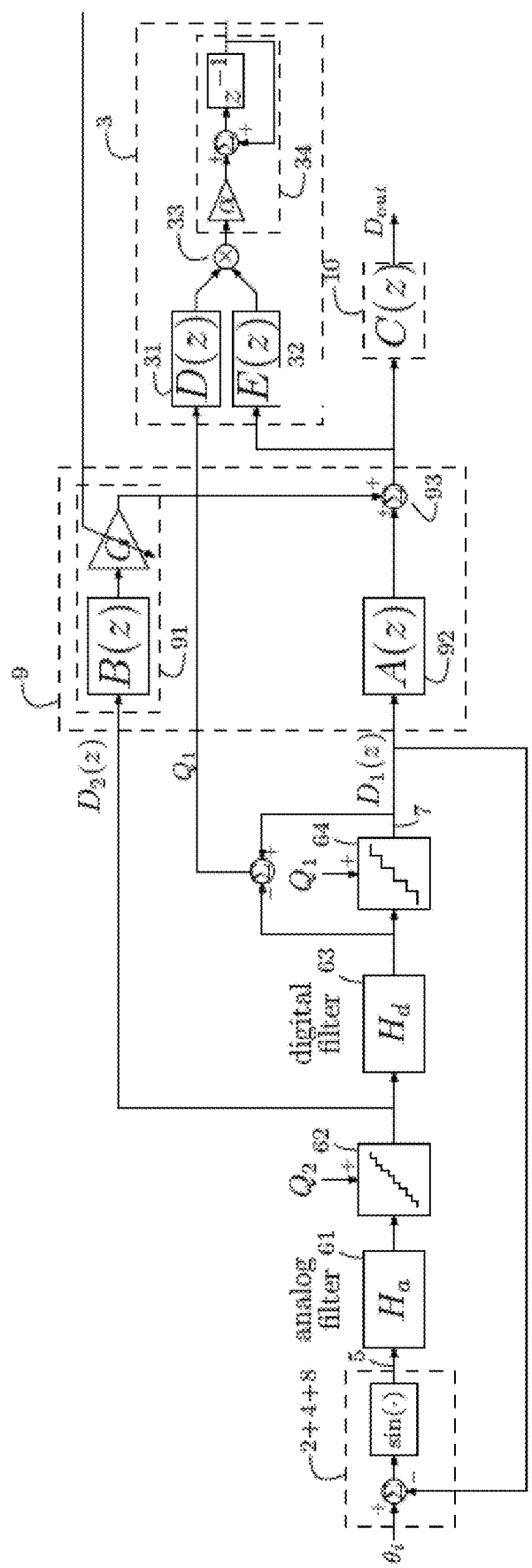
FIG. 12 illustrates an embodiment with adaptive gain correction.

In another embodiment the gain-variability of the analog filter $H_a$ is counteracted by introducing a compensating scale factor, for instance in the second recombination filter. This approach is illustrated in FIG. 12. In this embodiment the second recombination filter (22) comprises a programmable gain G, which allows scaling a signal in accordance with a gain control signal. The gain control signal is generated by a gain controller unit (3) which receives the output of the recombiner block (9) and the quantization noise $Q_1$. The quantization noise $Q_1$ can for instance be calculated by subtracting the input of the quantizer (64) from its output, both input and output being signals in the digital domain. The gain controller unit (3) comprises filtering means D(z) (31) and E(z) (32) for filtering its input signals, a multiplier (33) for making the product of these filtered signals and an adaptation controller (34) which adapts its output until its input signal becomes on the average zero.

Equation (19) provides the basis for understanding how the above and other more general adaptive schemes operate. For this, expression (19) is rewritten in the following more compact form:

$$D_{out}=A(z)\theta_i+A(z)/H_a(z)Q_2-\Delta(z)A(z)NTF(z)Q_1 \quad (21)$$

For reasons of clarity, the effect $\Delta$ has on the signal transfer function is disregarded. Note that this approximation is not strictly needed, because the adaptive scheme makes $\Delta$ small, so the approximation becomes more accurate over time. The three terms in (21), corresponding to $\theta_i$, $Q_1$ and $Q_2$ respectively, may be considered statistically uncorrelated. Optionally a filter D(z) may now be applied to the analog-to-digital converted output signal $D_{out}$ e.g., for reducing the signal-related component $\theta_i$. For instance, when $\theta_i$ occupies relatively low frequencies, as is typically the case in an angular sensor, D(z) could be a first order difference $1-z^{-1}$ or a second order difference $(1-z^{-1})^2$ which would largely eliminate the input signal component. The filtered output signal (i.e., $D(z)D_{out}$) is then given by eqn. (11) multiplied with D(z). The last term of the filtered output signal is then of the form $\Delta(z)E(z)Q_1$ with $E(z)=D(z)A(z)NTF(z)$. Because A(z), D(z) and also NTF(z) are known digital filter (see equation (12) for the NTF), E(z) is also a known filter. Now $Q_1$ is a calculable digital signal, and this can be filtered with the filter E(z). The filtered signals $D(z)D_{out}$ and $E(z)Q_1$ may then be multiplied, as is done in FIG. 12. The output of this multiplier provides a measure of the relative mismatch $\Delta$ (in a statistical sense). This multiplier output may be considered an error signal of the adaptation loop (which is to be minimized). It can indeed be shown that the expected value of the multiplier output is proportional to Δ, because the cross-terms in the product which relate to $\theta_i$ and $Q_2$ average to zero (since $\theta_i$ and $Q_2$ are uncorrelated to $Q_1$). Therefore, in accordance with present invention, the recombination filter A(z) and/or B(z) may be taken as adaptive filter. The parameters of the adaptive filter(s) may then be adapted in accordance to methods known in the art for minimizing the error signal, e.g., minimizing this error signal in a mean squared sense.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures analog filter (61), especially when it comprising one or more cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A position sensing device for measuring a position, the position sensing device comprising:
    a plurality of sensors, each of the plurality of sensors being arranged to produce a respective sense signal, each of the respective sense signals produced by the plurality of sensors being a function of an input phase representative of a position to be measured,
    a combiner circuit arranged to receive each of the sense signals respectively produced by the plurality of sensors and to generate an error signal by combining the respective sense signals produced by the plurality of sensors according to a plurality of weight factors, the error signal being indicative of a difference between an output phase representative of the position and the input phase representative of the position to be measured,
    a processing block comprising a loop filter to filter the error signal and to produce a filtered error signal, the processing block being further configured to obtain from the filtered error signal an estimated output phase, and
    a feedback loop comprising a feedback signal unit arranged for receiving the estimated output phase and for adjusting based on the estimated output phase the plurality of weight factors, so that the weight factors are a function of the estimated output phase,
    wherein the plurality of sensors comprises at least three sensors, each of the at least three sensors being arranged to respectively produce a sense signal, each of the respective sense signals produced by the at least three sensors being a different function of an input phase representative of a position to be measured.

2. The position sensing device as in claim 1, wherein the combiner circuit, the processing block, and the feedback signal unit are implemented in the digital domain.

3. The position sensing device as in claim 1, wherein the estimated output phase is a quantized signal.

4. The position sensing device as in claim 1, wherein the feedback signal unit comprises an angle-to-gain conversion block arranged for receiving the estimated output phase.

5. The position sensing device as in claim 4, further comprising a digital gain control unit arranged to adapt the weight factors.

6. The position sensing device as in claim 5, wherein the plurality of weight factors is implemented by switchably connected components in the digital gain control unit.

7. The position sensing device as in claim 1, wherein the sensors are magnetic sensors arranged for measuring an angle of a magnetic field.

8. The position sensing device as in claim 1, wherein the error signal is proportional to the difference between the output phase and the input phase.

9. The position sensing device as in claim 1, wherein the weight factors are trigonometric functions of the estimated output phase.

10. The position sensing device as in claim 1, wherein the feedback signal unit is arranged for adjusting the plurality of weight factors based on software-based calculations and/or digital logic performed on the estimated output phase.

11. The position sensing device as in claim 1, wherein the number of weight factors equals the number of sensor signals.

12. A position sensing device for measuring a position, the position sensing device comprising:
    a plurality of sensors including at least a first sensor and a second sensor, each of the plurality of sensors being arranged to produce a respective sense signal such that the first sensor produces at least a first sense signal and the second sensor produces at least a second sense signal, each of the respective sense signals produced by the plurality of sensors being a function of an input phase representative of a position to be measured,
    a combiner circuit arranged to receive each of the sense signals produced by the plurality of sensors including the first sense signal and the second sense signal and to generate an error signal by combining each of the sense signals produced by the plurality of sensors including the first sense signal and the second sense signal with a plurality of corresponding weight factors, the error signal being indicative of a difference between an output phase representative of the position and the input phase representative of the position to be measured,
    a processing block comprising a loop filter to filter the error signal and to produce a filtered error signal, the processing block being further configured to obtain from the filtered error signal an estimated output phase, and
    a feedback loop comprising a feedback signal unit arranged for receiving the estimated output phase and for adjusting based on the estimated output phase the plurality of weight factors, so that the weight factors are a function of the estimated output phase,
    wherein the plurality of sensors includes a third sensor, wherein the third sensor is arranged to produce a third sense signal, the third sense signal also being a function of an input phase representative of a position to be measured.

13. The position sensing device as in claim 12, wherein the combiner circuit is arranged to combine the first sense signal and the second sense signal with a plurality of corresponding weight factors by multiplying the first sense signal with a first corresponding weight factor and the second sense signal with a second corresponding weight factor.

14. The position sensing device as in claim 12, wherein the combiner circuit is arranged to receive the first sense signal, the second sense signal, and third sense signal and to generate an error signal by combining the first sense signal, the second sense signal, and third sense signal with a plurality of corresponding weight factors, the error signal being indicative of a difference between an output phase representative of the position and the input phase representative of the position to be measured.

* * * * *